United States Patent
Zelinkovsky

[11] Patent Number: 5,928,294
[45] Date of Patent: Jul. 27, 1999

[54] TRANSPORT SYSTEM

[76] Inventor: Reuven Zelinkovsky, Kibbutz Yahad. Dn.N., Misgav 20182, Israel

[21] Appl. No.: 08/682,720

[22] PCT Filed: Feb. 1, 1995

[86] PCT No.: PCT/GB95/00204

§ 371 Date: Jul. 29, 1996

§ 102(e) Date: Jul. 29, 1996

[87] PCT Pub. No.: WO95/21405

PCT Pub. Date: Aug. 10, 1995

[30] Foreign Application Priority Data

Feb. 3, 1994 [IL] Israel .......................................... 108549

[51] Int. Cl.⁶ .................................................. G06F 165/00
[52] U.S. Cl. ........................... 701/24; 701/117; 318/587; 180/168
[58] Field of Search ................................. 701/23, 24, 25, 701/26, 117, 118; 342/454, 455, 456; 180/167, 168, 169; 318/587

[56] References Cited

U.S. PATENT DOCUMENTS

| | | | |
|---|---|---|---|
| 4,361,202 | 11/1982 | Minovitch | 701/24 |
| 4,987,540 | 1/1991 | Luke, Jr. | 701/24 |
| 5,111,401 | 5/1992 | Everett, Jr. et al. | 701/24 |
| 5,126,941 | 6/1992 | Gurmu et al. | 701/24 |
| 5,297,049 | 3/1994 | Gurmu et al. | 701/117 |
| 5,504,683 | 4/1996 | Gurmu et al. | 701/117 |
| 5,625,559 | 4/1997 | Egawa | 701/117 |

FOREIGN PATENT DOCUMENTS

| | | |
|---|---|---|
| 0 229 669 | 7/1987 | European Pat. Off. . |
| 0 330 639 | 8/1989 | European Pat. Off. . |
| 0 367 527 | 5/1990 | European Pat. Off. . |
| 0 482 424 | 4/1992 | European Pat. Off. . |
| 2636750 | 3/1990 | France . |
| 26 31 543 | 1/1978 | Germany . |
| WO A 82 00122 | 1/1982 | WIPO . |
| WO A 92 09941 | 6/1992 | WIPO . |

OTHER PUBLICATIONS

Patent Abstracts of Japan, vol. 6, No. 137, p. 130, Jul. 24, 1982.

*Primary Examiner*—Gary Chin
*Attorney, Agent, or Firm*—Nixon & Vanderhye P.C.

[57] ABSTRACT

A transport system which includes a communications network and one or more vehicles each having an on-board control and data exchange unit, wherein the communications network includes a transport control unit; and a plurality of road units arranged in series along a vehicle travel route, each road unit being adapted for communication with the transport control unit so as to exchange data therewith, and being further adapted for direct communication with at least two road units positioned adjacent thereto, wherein the on-board control and data exchange unit includes transceiver apparatus for communicating with each of the plurality of road units in series while traveling therepast; data processing apparatus connected to the transceiver apparatus; and control apparatus, connected to the data processing apparatus for selectably controlling and sensing any of a predetermined plurality of vehicle operating functions in response to signals received by the transceiver apparatus from the road units.

28 Claims, 14 Drawing Sheets

TRANSPORT SYSTEM

FIELD OF THE INVENTION

The present invention relates to automated transport systems in general, and, in particular, to automated road vehicle transport systems.

BACKGROUND OF THE INVENTION

There are various problems associated with road transport. Among these problems are road accidents caused by human-related factors, such as tiredness, loss of control, a slow reaction time, limited field of view, insufficient maintenance of distance between vehicles, and inattention to traffic signs. A further transport-related problem is that of loss of time which may be caused by slow driving speed due to weather conditions, road conditions, visibility, and traffic congestion, for example. Unfamiliarity with the route may also cause a loss of time.

Apart from the inconvenience which may be caused by any of the above factors, these factors also represent a huge economic burden on developed society. If for these reasons alone, it would be desirable to provide an automated traffic system which substantially reduced the above problems.

During recent years the development of automated traffic systems has received increased attention, and substantial effort has been invested in trying to find a solution to problems such as those outlined above.

Two articles, entitled 'The Intelligent Vehicle-Highway Systems Program in the United States' and 'RTI/IVHS on European Highways' appear in the ITE 1993 Compendium of Technical Papers. These articles give a general overview of programs that are being developed and the aims of these programs, in the United States and Europe.

These programs, which relate to IVHS (intelligent vehicle-highway systems), are concerned with a wide range of different aspects of automation, such as, automatic vehicle identification for purposes of automatic tolling on toll roads; relaying of up-to-date information to drivers in order to improve their decision-making ability; and automatic driving systems.

Among various systems that have been developed are the following:

satellite-based vehicle navigation systems;

traffic management systems based on a local and international integrated sensing and communications systems for passing information to drivers on road and traffic conditions, and for controlling traffic lights and electronic signs;

two-way communications systems with drivers via radio beacons and transponders located by the side of the road or beneath it—these systems can automatically identify vehicles and broadcast thereto a wide range of different types of information, such as navigational instructions, traffic conditions, and the like; and automatic driving based on an on-board computerized control system, and on radio connection between vehicles and sensing devices for measurement of the inter-vehicle distance, wherein travel is carried out in 'platoons', wherein each platoon has predetermined travel and communication procedures. Platoon-oriented systems are described in a paper entitled 'Sketch of an IVHS Systems Architecture', published by the Institute of Transportation Studies of the University of California, Berkeley.

While each system has its advantages and disadvantages, none of the systems known to the present Applicant constitutes a comprehensive answer to the problems outlined above.

An indication of the state of the art is provided by published PCT application no. PCT/US91/08892, publication no. WO 92/09941, entitled "Downward Compatible AGV System and Methods." This publication discloses an automated guided vehicle (AGV) control system which is downward compatible with existing guidewire systems providing both guidewire navigation and communication and guidance and wireless communication between a central controller and each vehicle, Autonomous vehicle navigation comprises travel over paths marked by update markers which may be spaced well apart, such as 50 feet (about 16 m).

Redundant measurement capability comprising inputs from linear travel encoders from the vehicle's drive wheels, position measurements from update markers, and bearing measurements from a novel angular sensing apparatus, in combination with the use of a Kalman filter, allows correction for navigation and guidance errors caused by such factors as angular rate sensor drift, wear, temperature changes, aging, and early miscalibration during vehicle operation. The control system comprises high frequency two-way data transmission and reception capability over the guidewires and via wireless communications. The same data rates and message formats are used in both communications systems. The above-outlined system is intended for purpose-built vehicles used in a warehouse situation. Accordingly, while addressing certain points of automated control of vehicles, it does not provide a solution to the various transport related problems discussed herein.

The following patent publications are also known: EP482424, EP229669, WO8200122 and EP367527. These publications describe systems that are intended for controlling vehicles in limited, defined areas, such as on factory floors, in the area of production lines, warehouses and the like. These systems include several dozen vehicles that travel in predetermined fashion along fixed routes, with fixed stopping places or stations, and which travel over a distance of between several dozen meters and several kilometers.

The operating principles of the systems described in above four documents do not permit management of a transport system on a large, substantially unlimited scale. The main reason for this, common to all these systems, is the fact that each system employs a vehicle communications and control system which employs a single central computer which manages all of the users, and all of the communications. To the best of our knowledge, no single computer exists which is capable of handling the tasks of continuous, real-time vehicle control, in a transport system encompassing possibly many millions of vehicles. It is thus apparent that none of these systems is either intended or presumes to be capable of managing a large scale transport system.

U.S. Pat. No. 4,361,202 describes a transport system that may contain millions of vehicles, but it is based on a single central computer, with its inherent drawbacks, as discussed above. Furthermore, no continuous communications exist between this system and the vehicles 'controlled' thereby. System to vehicle communications are established at commencement of a journey only, by means of a radio-telephone link to the control center operated by a vehicle driver, so as to receive details of a recommended route, including driving directions that are recorded in the memory of a computer in the vehicle. Subsequently, unless the driver initiates further communication with the control center, no communications occur until the end of the journey. The vehicle drives itself in accordance with the route plan stored in its computer memory, and, further, in accordance with information provided by transponders along the route that provide to the vehicle information concerning the conditions and physical parameters at the transponder locations, rather than information particular to any specific vehicle traveling therepast.

This operating principle is based on the assumption that no changes will occur (or be required) and that the transport system will behave in practice exactly as planned—an assumption which, it is submitted, is totally inconsistent with modern driving conditions.

This system employs feedback from magnetometers or radar for detection of the speed and type of vehicles traveling along different routes. The system is not provided with any feedback in terms of the location of any particular vehicle or in terms of its mechanical/safety state, and is thus incapable of controlling vehicles individually, relating to vehicles as part of a mass only. Accordingly, it does not provide continuous and real time control of any specific vehicle.

SUMMARY OF THE INVENTION

The present invention aims to provide an automated road-vehicle transport system which optimizes travel, in terms of speed, safety and economy, thereby significantly reducing problems associated with and caused by non-automated road-vehicle transport systems.

The present invention further seeks to provide an automated road-vehicle transport system which provides a comprehensive solution to known traffic problems, in contrast to prior art automated systems which address certain aspects of traffic problems only.

There is thus provided, in accordance with a preferred embodiment of the invention, a transport system which includes a network of intersecting travel routes having associated therewith a corresponding network of road-based communications units therealong; a plurality of vehicles for travel along the network of intersecting routes; and a control and communications system for controlling travel of the vehicles along the network.

The network is subdivided into a plurality of contiguous segments; the control and communications system is a decentralized, hierarchical modular system providing real-time individualized control of each vehicle within the network and guidance thereof to a selected travel destination while taking into account the operational status and guidance of others of the vehicles traveling within the network.

The control and communications system employed in the transport system of the invention is made up of at least first, second and third hierarchical intercommunicating levels of control and communications, of which the first level includes vehicle mounted on-board control and data exchange apparatus; and the second level includes a plurality of the road-based units arranged in series along each segment such that each road-based unit located along a selected travel route is operative, in turn, to establish two-way communications with the on-board control and data exchange apparatus of each vehicle traveling therepast.

The on-board control and data exchange apparatus is further operative to utilize the two-way communications for providing lateral and longitudinal positioning of the vehicle relative to a travel route.

The third level includes a plurality of intercommunicating network segment control units for data processing and two-way communications with each of the road-based communications units in a corresponding plurality of predetermined network segments.

Each on-board control and data exchange apparatus is operative to selectably sense and control operational functions of each vehicle so as to permit automated guidance thereof to a selected travel destination. The two-way communications between each on-board control and data exchange apparatus and the road-based units in proximity therewith includes at least transmission therebetween of mutual identification data and transmission of vehicle operating data from the on-board apparatus to the road-based units.

The on-board control and data exchange apparatus of each vehicle is operative to maintain two-way communications with at least one of the road-based units at all times during vehicle operation. Data received from the on-board units is processed by the road units, and is selectably communicated to the segment controller unit, in accordance with the operating mode of the road units and, further, in accordance with predetermined parameters.

Furthermore, each of the segment control units includes interface apparatus for exchanging with each of the plurality of the road-based units located in each network segment at least identification and operation data of each vehicle traveling in a selected network segment in proximity to the plurality of road-based units therein; and apparatus for evaluating optimal travel parameters for each vehicle.

The interface apparatus of the segment control unit is operative to transmit to the road-based units vehicle operation commands for each vehicle proximate thereto, in accordance with the optimal travel parameters; the road-based units are operative to transmit the vehicle operation commands to the vehicle traveling in proximity thereto; and, in response to reception of vehicle operation data, the apparatus for evaluating optimal travel parameters is operative to re-evaluate the travel parameters and to update the vehicle operation commands in accordance therewith.

Additionally in accordance with a preferred embodiment of the invention, the transport system has at least a fourth hierarchical level of control and communications.

This fourth level includes at least one super control unit for data processing and two-way communications with a plurality of segment control units which together control operation of vehicles in an area containing a predetermined contiguous plurality of the network segments.

Each segment control apparatus further has additional interface apparatus for exchange, via parallel bus apparatus, between each segment control unit and the super control unit, of additional vehicle-related data which, in accordance with predetermined criteria, may influence the evaluation of the travel parameters of other vehicles traveling in any part of the area containing the predetermined contiguous plurality of the network segments.

Preferably, each super control unit has interface apparatus for exchanging with the plurality of segment control units vehicle the additional vehicle-related data; and apparatus for processing the additional vehicle-related data so as to provide further travel data.

The interface apparatus of the super control unit is operative to transmit to the interface apparatus of each segment control unit the further travel data relevant to the evaluation of the optimal travel parameters of vehicles traveling in the network segment associated therewith.

The present system has a modular construction, and may thus be formed so as to have yet a further plurality of hierarchical control levels, each having a plurality of the super control units for controlling vehicles in a predetermined region containing a plurality of contiguous areas. It will be appreciated that, in the described construction, each of the different hierarchical levels controls a level immediately therebeneath in the hierarchy.

Typically, each hierarchical control level has at least one communication apparatus for selectably communicating with a control level immediately therebeneath in response to reception of input signals therefrom; and at least one data processing apparatus, connected to each communication apparatus of the hierarchical control level, for processing input data corresponding to the input signals, and for providing output data for transmission by the communication apparatus to the control level immediately therebeneath in the form of output signals.

Additionally in accordance with a preferred embodiment of the invention, the apparatus for evaluating optimal travel parameters is operative to provide vehicle operating data for a plurality of vehicles to a plurality of the road units located along respective travel paths of the plurality of vehicles. Each road unit is operative to store the data, and is further operative, in response to receiving the identity of each the vehicle from the on-board apparatus thereof, to provide thereto the operating data for the vehicle associated therewith.

Further in accordance with a preferred embodiment of the present invention, each road-based unit is connected, via parallel communications apparatus and a parallel bus, to a predetermined one of the segment control units and includes the following:

a transceiver, antenna apparatus for facilitating communications between the on-board units and the transceiver apparatus, and data processing apparatus. The data processing apparatus is associated with the transceiver apparatus, and is operative to receive data from and to send data to the on-board units, for exchanging data with an associated segment control unit via the parallel communications apparatus. The data processing apparatus is further operative to process data received from the on-board units and from the associated segment control unit.

Additionally in accordance with a preferred embodiment of the invention, each road-based unit is further connected, via a serial bus, to at least one adjacent road-based unit, wherein each road-based unit also includes additional transceiver apparatus for exchanging data between the adjacent road-based units.

Most preferably, there is provided a cable construction which contains at least a plurality of the road-based units, the serial buses therebetween, and the parallel buses.

Further in accordance with a preferred embodiment of the invention, there may also be provided a serial bus connecting between preselected road-based units of adjacent segments, wherein a first road-based unit of a first segment is operative to exchange with a second road-based unit of a second segment, via the serial bus, data relating to vehicles traveling from the first segment to the second segment, thereby to facilitate continuous control of the vehicles by the system.

Additionally in accordance with a preferred embodiment of the invention, the on-board control and data exchange apparatus and each road-based unit are selectably operable in either a first, fully automatic mode or in a second, non-fully automatic man-in-the loop mode.

Further in accordance with a preferred embodiment of the invention, each on-board control and data exchange apparatus includes a transceiver for communicating with each of the plurality of road-based units in series while traveling therepast;
data processing apparatus connected to the transceiver apparatus; and control apparatus, connected to the data processing apparatus for selectably controlling and sensing any of a predetermined plurality of vehicle operating functions in response to signals received by the transceiver apparatus from the road-based units.

The road-based units are arranged along a predetermined path along the travel route and are operative, in conjunction with the on-board apparatus, to enable a predetermined positioning of the vehicle relative to the predetermined path.

Additionally in accordance with a preferred embodiment of the invention, the interface apparatus of the segment control unit is operative to transmit to the data processing apparatus of each road-based unit located along the travel paths of a plurality of vehicles, travel data relating to each of these vehicles, so that each of these road-based units is operative to anticipate the arrival of vehicles of known identities.

Further in accordance with a preferred embodiment of the invention, the on-board control and data exchange apparatus also includes antenna apparatus mounted in a predetermined position on the vehicle and associated with the data processing apparatus.

One of the antenna apparatus of the on-board unit and of the road-based unit is a pair of antennae arranged in a predetermined orientation and having receiver apparatus and comparator apparatus associated therewith, for providing an output indication of the position of the vehicle relative to the predetermined path.

Preferably, the pair of antennae, the receiver apparatus and the comparator apparatus form part of the on-board control and data exchange apparatus on the vehicle, and are connected to the data processing apparatus thereof.

Additionally in accordance with a preferred embodiment of the invention, the longitudinal spacing between adjacent road-based units is of smaller magnitude than the longitudinal reception range of the on-board control and data exchange apparatus, such that the on-board apparatus is always in communications range of at least one road-based unit along its travel route.

BRIEF DESCRIPTION OF THE DRAWINGS

The present invention will be more fully understood and appreciated from the following detailed description, taken in conjunction with the drawings, in which.

DETAILED DESCRIPTION OF THE INVENTION

It will be appreciated from the ensuing description that the present invention provides an automated road-vehicle transport system which optimizes travel, in terms of both speed, safety and economy, thereby providing a comprehensive solution to many problems associated with and caused by non-automated road-vehicle transport systems. The present system also provides a solution that is therefore more comprehensive than any of those suggested in the prior art.

The system of the present invention has the following capabilities:

1. automatic and optimal navigation—taking into account both travel time and driving conditions on alternative routes;
2. fully automatic driving on main highways, multi-lane routes, single lane or narrow routes and junctions;
3. bi-directional communications via a communications network connecting drivers, automatic vehicle driving systems, sensory devices and installations (weather etc.), a hierarchy of transport control centers, and stationary addresses such as vehicle fleet owners, individuals and government bodies;
4. real time identification and location of individual vehicles; and
5. automatic toll levying.

It will further be appreciated that on routes encompassed by the system of the invention traffic signs and signals are rendered redundant. To the extent that routes not encompassed by the system are integrated into the system, selectable manual control, in predetermined situations is retained. The present system is also constructed so as to enable the addition of further control and communications features.

Figure 1:
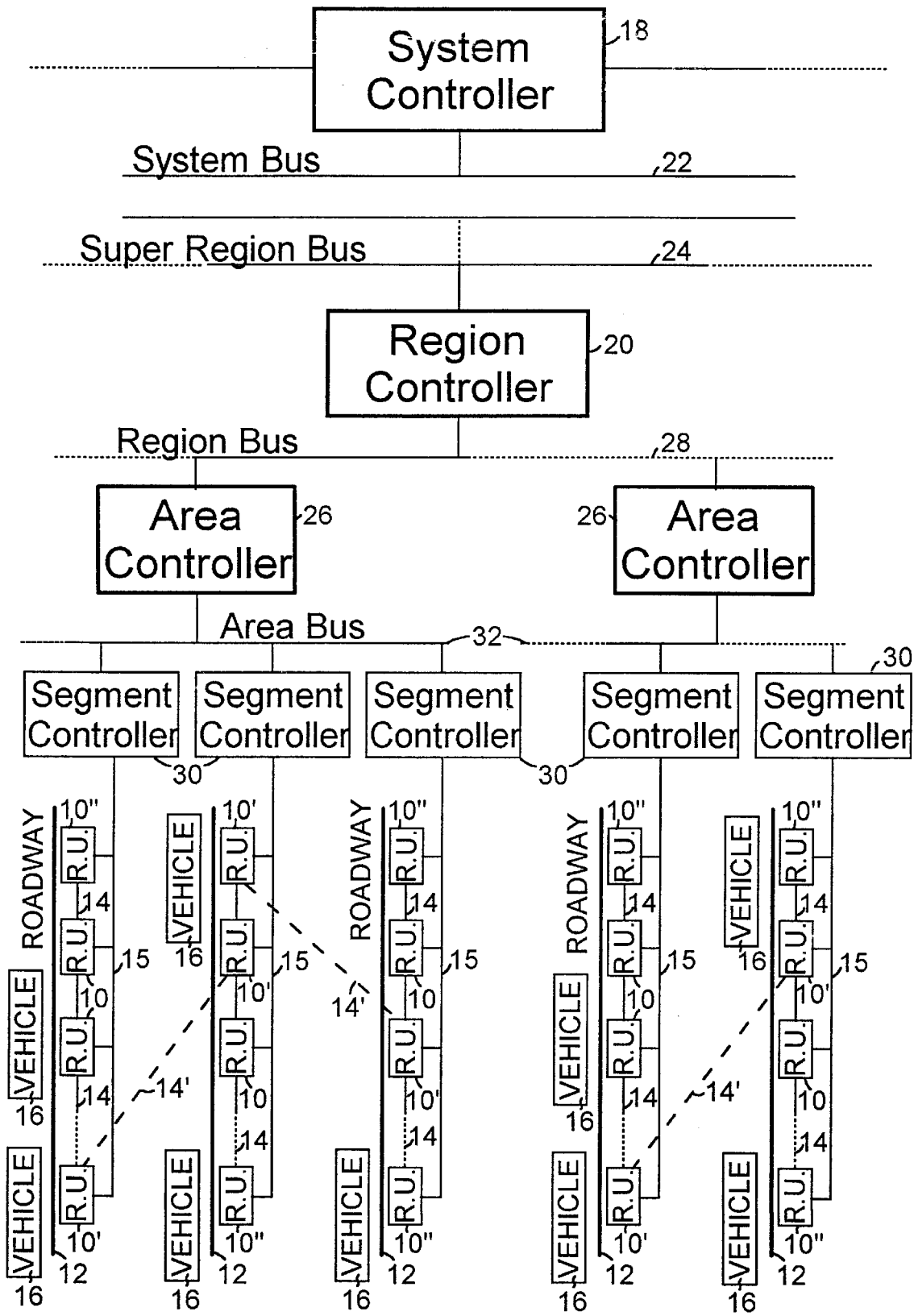
FIG. 1 is a block diagram illustration of a transport system, constructed and operative in accordance with a preferred embodiment of the present invention.

Referring now to FIG. 1, there is shown a transport system, constructed and operative in accordance with a preferred embodiment of the present invention. The transport system of the invention includes a control network which includes a plurality of road units 10, arranged in series along a vehicle travel route or roadway, referenced 12. Road units 10 are denoted by the initials "RU" in FIG. 1.

The road units are arranged in series along a multi-channel communications cable, shown schematically at 13 (FIGS. 3 and 10), and are operative to communicate both with vehicles 16 traveling along roadway 12, and with transport control units at various hierarchical levels, as described below. Communication between road units 10 and the transport control unit is carried out via a communications bus 15.

Communications cable 13 contains, in a single cable construction, a plurality of road units 10 which are connected via a serial link, referenced 14, for direct serial communications between road units 10. Cable 13 further includes various parallel buses serving the transport control units at the various hierarchical levels of the present system.

The described arrangement, whereby each road unit 10 is connected via serial link 14 in a straight line, ensures the fast and immediate transfer of information both in the direction of the flow of traffic and in the reverse direction, and is operative to control the local speed of the vehicles, turns (passage between lanes and exiting from the road), emergency braking, and various other situations whereby a local, "reflex" type decision is required.

The control network is divided up into different hierarchical levels, each successive level encompassing a successively larger geographical area of roadways or routes.

Figure 2:
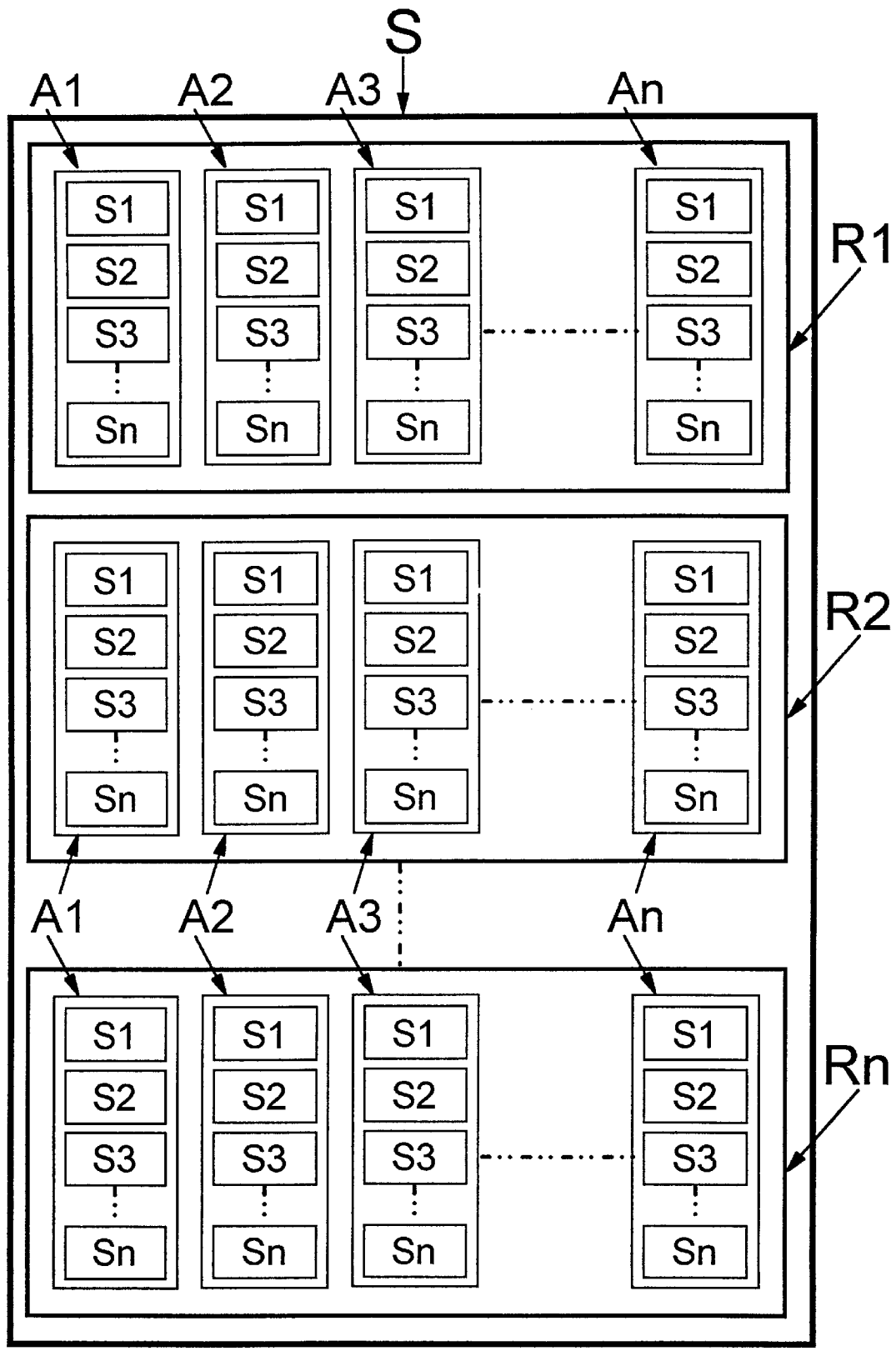
FIG. 2 is a diagrammatic representation of a geographical area in which the system of the invention has been installed, illustrating the hierarchical nature of the system.

Referring now also to FIG. 2, it is seen that each geographical portion is a constituent division of a larger portion. It is thus seen that the largest portion, labeled "S", represents the highest level in the example and geographically encompasses the entire transport system of the invention. Portion S is controlled by a system controller, seen at 18 in FIG. 1, and is divided into regions labeled "R1", "R2", . . . , "Rn", each of which is controlled by a region controller, seen at 20 in FIG. 1.

Communications between each region controller 20 and the system controller 18 is by an appropriate parallel communications channel, typically a bus. As seen in FIG. 1, this may either be a system bus 22, or, if one or more intervening levels of control are interposed between the region controllers 20 and system controller 18, there may also be one or more intervening communications buses. This is indicated by the 'super region bus' 24 in FIG. 1.

As seen in FIG. 2, each region is divided into areas, labeled "A1", "A2", "A3", . . . , "An", each of which is controlled by an area controller, seen at 26 in FIG. 1. Region controller 20 communicates with its constituent area controllers 26 via a 'region' communications bus 28. Finally, each area is divided into segments labeled "S1", "S2", . . . , "Sn", each of which comprises a plurality of road units 10 (FIG. 1) controlled by a segment controller, seen at 30 in FIG. 1. Communication between each segment controller 30 and area controller 26 is via an 'area' communications bus 32. Road units 10 communicate with an associated segment controller 30 via a segment communications bus 15. This is parallel to inter-road unit communications which, as described are carried out via serial link 14.

The controllers at the various levels, via the various parallel communication channels or buses, are responsible for management of the system. This includes a variety of function, which include, by way of example, planning and control of vehicle routes, planning and management of the average journey speeds on different roads, receipt and delivery of messages, processing of information on driving conditions (weather, accidents, traffic jams and so on), and debiting on toll roads. These functions are exemplified in greater detail hereinbelow.

It will be appreciated that the highest level of control need not be that represented by portion S, but, as the need arises and as the geographical extent of the system is extended, successively higher levels of control may be added.

Figure 3:
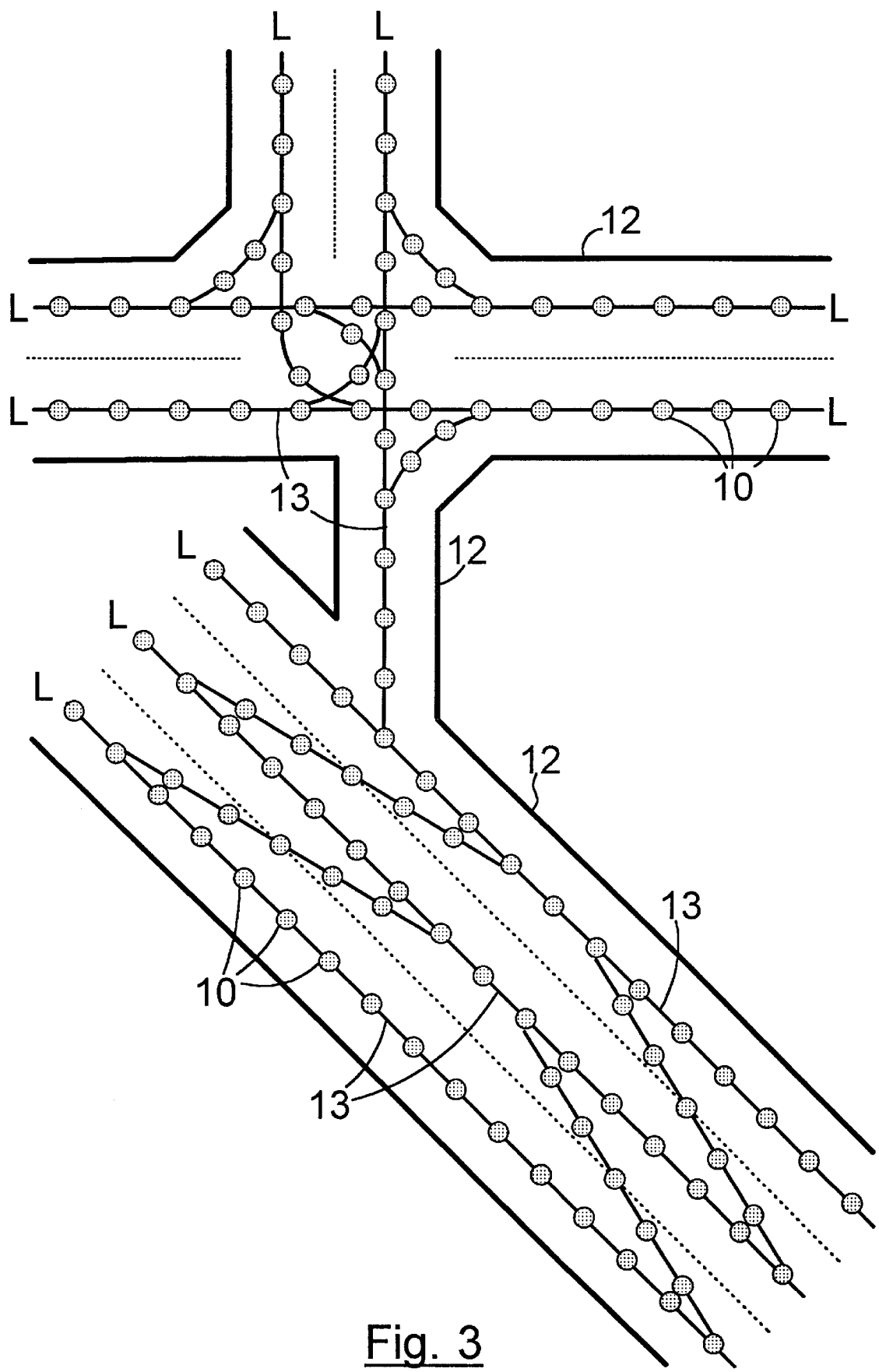
FIG. 3 is a schematic illustration of a plurality of different types of intersecting roadways in which a communication network has been installed.

The distribution of road units 10 along different types of roadway 12, is seen schematically in FIG. 3. This is described more fully hereinbelow.

Briefly, the function of each road unit 10 is to communicate with vehicles 16, as described hereinbelow in detail, and with an associated segment controller 30 so as to exchange data therewith, thereby also permitting, inter alia, the exchange of data between the control network and individual vehicles. Each road unit 10 is further operative to communicate with at least two road units positioned adjacent thereto. This too is described in detail hereinbelow.

Figure 4A:
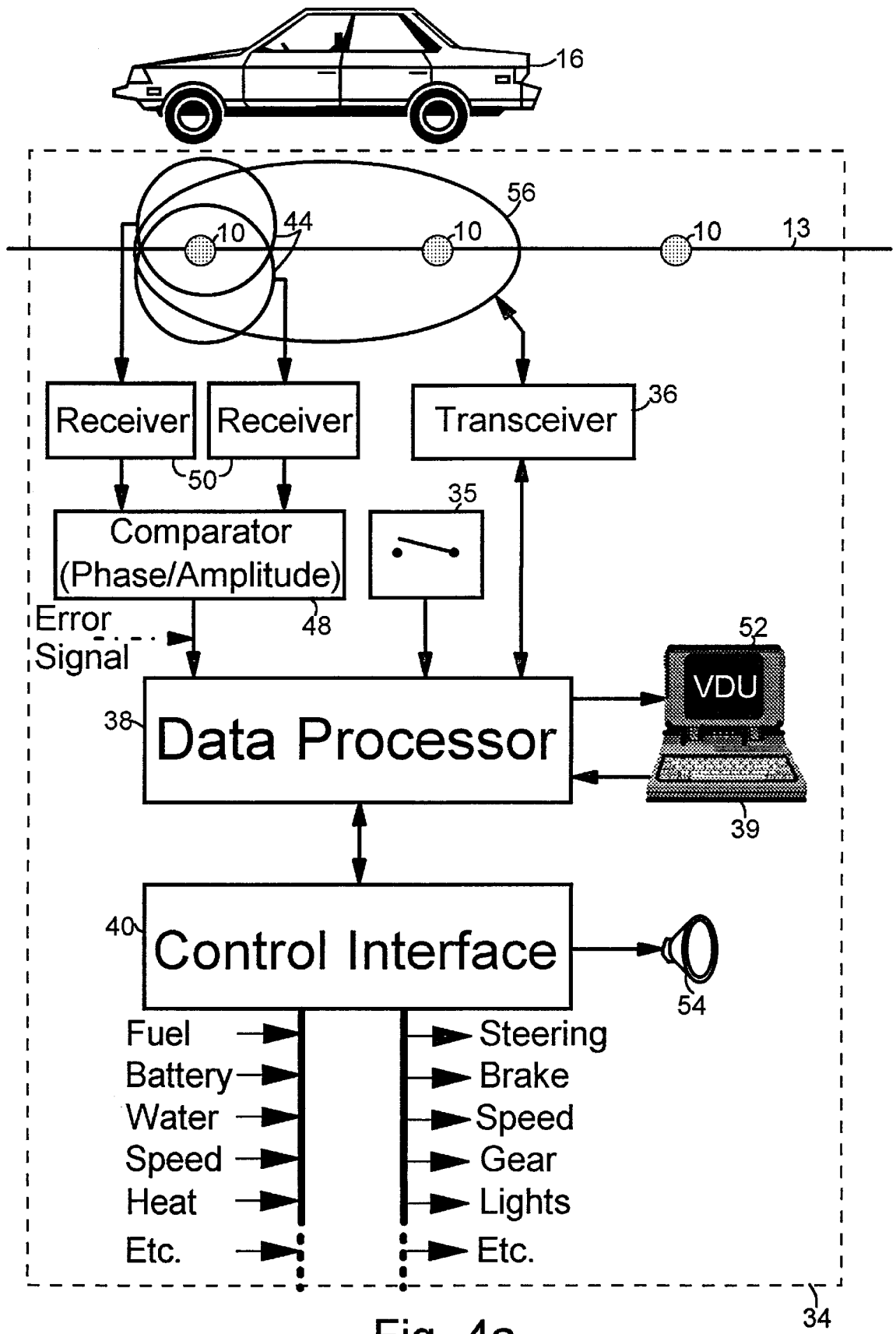
FIG. 4A is a block diagram illustration of an on-board vehicle control and data exchange unit constructed in accordance with a preferred embodiment of the present invention.

Referring now to FIG. 4A, a vehicle 16 forming part of the present system is equipped with an on-board control and data exchange unit referenced generally 34 which is operative both to communicate with the communication network via road units 10 (FIG. 1), and also to navigate and generally control the vehicle.

Unit 34 is selectably actuable via an on-off power switch 35, and includes a transceiver 36 for communicating with road units 10 while traveling therepast, a data processor 38 connected to transceiver 36, and a control unit 40. A control unit or interface 40 is connected to data processor 38 for coordinating between data processor 38 and the various vehicle operating and sensory functions, such as, steering, braking, acceleration, transmission, lights, fuel level, engine temperature, and oil pressure.

Thus the system is able to control any of a predetermined plurality of vehicle operating functions independently and in response to signals received by transceiver 36 from the communications network via road units 10. The precise manner in which vehicle functions are controlled and monitored may be substantially as described in published PCT application no. PCT/US91/08892, publication no. WO 92/09941, entitled "Downward Compatible AGV System and Methods," the contents of which are incorporated by reference. Accordingly, as vehicle function control is thus known in the art, it is not necessary to describe it specifically herein.

Figure 4B:
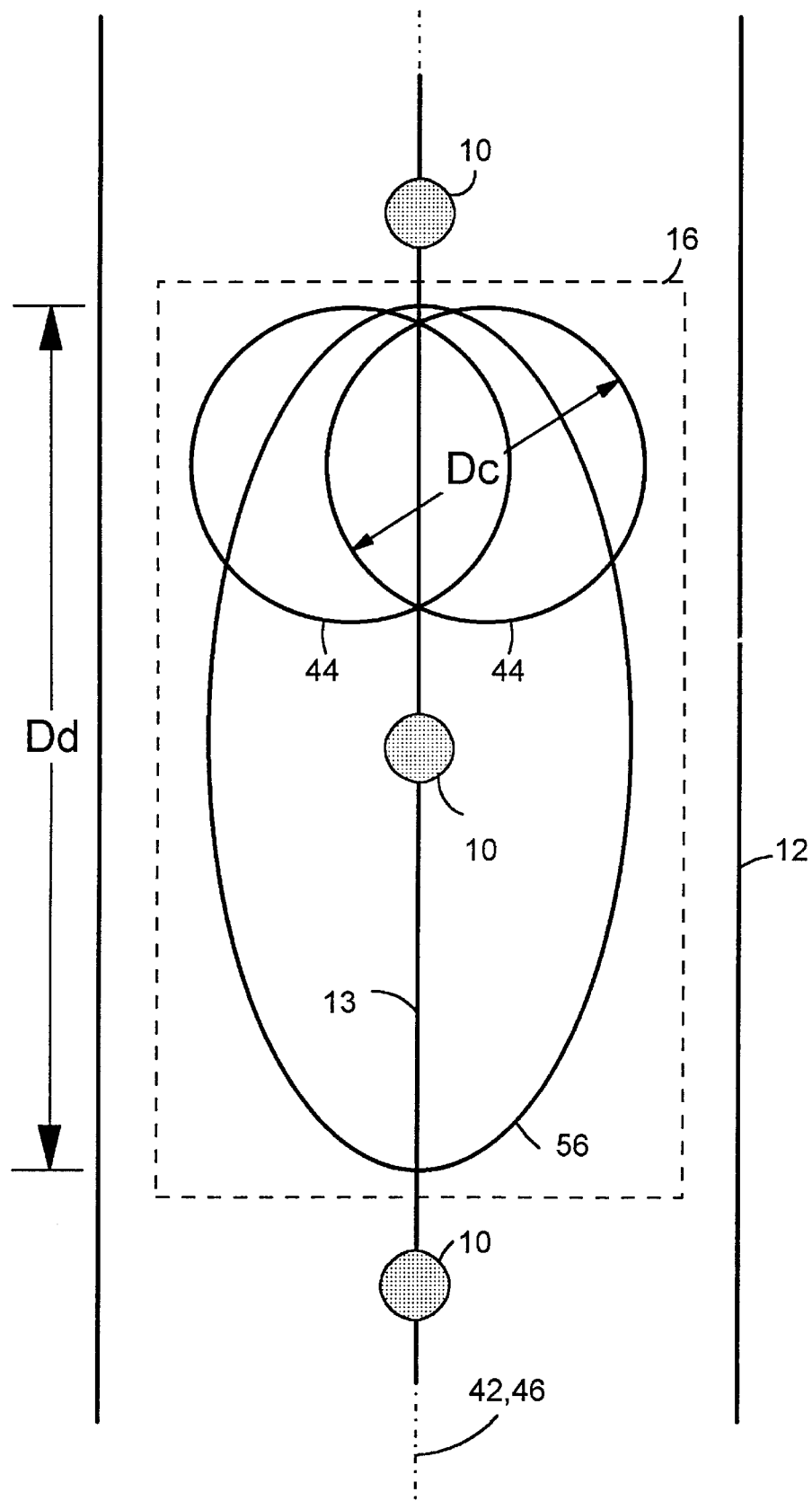
FIG. 4B is a schematic plan view of a vehicle arranged so as to be longitudinally centered over the longitudinal axis of a roadway lane, in accordance with the present invention.

In order to be able to permit fully automatic safe operation of vehicle 16 via the transport system, several factors, including, inter alia, the location, speed, and orientation of the vehicle, must be known at all times. Referring now also to FIG. 4B, determination of the position of the vehicle on a roadway is facilitated by first, positioning communications cable 13 along the longitudinal axis 42 of a roadway 12 or of a lane portion thereof, referenced 'L' (FIG. 3) and, second, by centering of the vehicle 16 over communications cable 13, thereby to provide a corresponding centering of the vehicle over the longitudinal axis 42 of a roadway or lane. Preferably, cables 13 are buried beneath the asphalt or concrete road surface.

In order to center vehicle 16 over cable 13, on-board unit 34 further has a pair of antennae 44 which are aligned symmetrically about the longitudinal axis 46 (FIG. 4B) of vehicle 16. The antennae 44 are adapted to detect a signal, preferably a radio signal, emitted by a road unit 10 as the vehicle travels thereover. Each antenna 42 is connected to a comparator 48 (FIG. 4A) via a receiver 50. Upon receiving signals from road unit 10 via antennae 44 and receivers 50, the comparator 48, which may be a phase or amplitude comparator, is operative to compare the signals and to generate an error signal output which is provided to data processor 38. The value of the error signal thus provided indicates the position of the vehicle 16 with respect to communications cable 13. When the vehicle is properly centered, the error signal approximates to zero.

If the error signal is found to indicate that the vehicle is not properly centered, data processor 38 is operative to drive control interface 40 so as to operate the vehicle, via any of the vehicle control systems, such as, steering, brakes, fuel pedal, thereby to properly center the vehicle.

Preferably, the longitudinal reception range (typically 1.2 meters) of the two centering antennae 44 overlaps the beginning of the longitudinal reception range of a main communications antenna 56, so that at any speed the centering antennae 44 will receive at least one response transmission from each road unit 10.

It will thus be appreciated that the centering is carried out via interaction between the on-board unit 34 and road unit 10. Centering may thus be performed fully automatically, as described above. Alternatively, centering may be carried out non-fully automatically, with a man-in-the-loop, whereby driving adjustments required to properly center the vehicle are displayed on a visual display unit 52 and/or provided as audible instructions via a speaker 54, thereby enabling a person operating the vehicle to perform the necessary position adjustments. Both visual display unit 52 and speaker 54, where provided, are connected to the data processor 38. It will be appreciated that, as centering is carried out in real time, while the vehicle 16 proceeds along the roadway 12, the on-board unit, 34 operates in conjunction and communicates with a plurality of road units 10 in succession.

In addition to the two antenna 44 which serve for centering vehicle 16, there is also provided a main communications antenna, referenced 56. Antenna 56 is connected to transceiver 36 and is operative to transmit probing signals (as described below) and to receive and transmit data messages between data processor 38 and road units 10.

It will be appreciated by persons skilled in the art that while it is preferred to provide separate centering and communications antennae, in accordance with an alternative embodiment of the invention, these functions may be combined such that a pair of antennae is provided which serve both for centering and for other communications.

Figure 5:
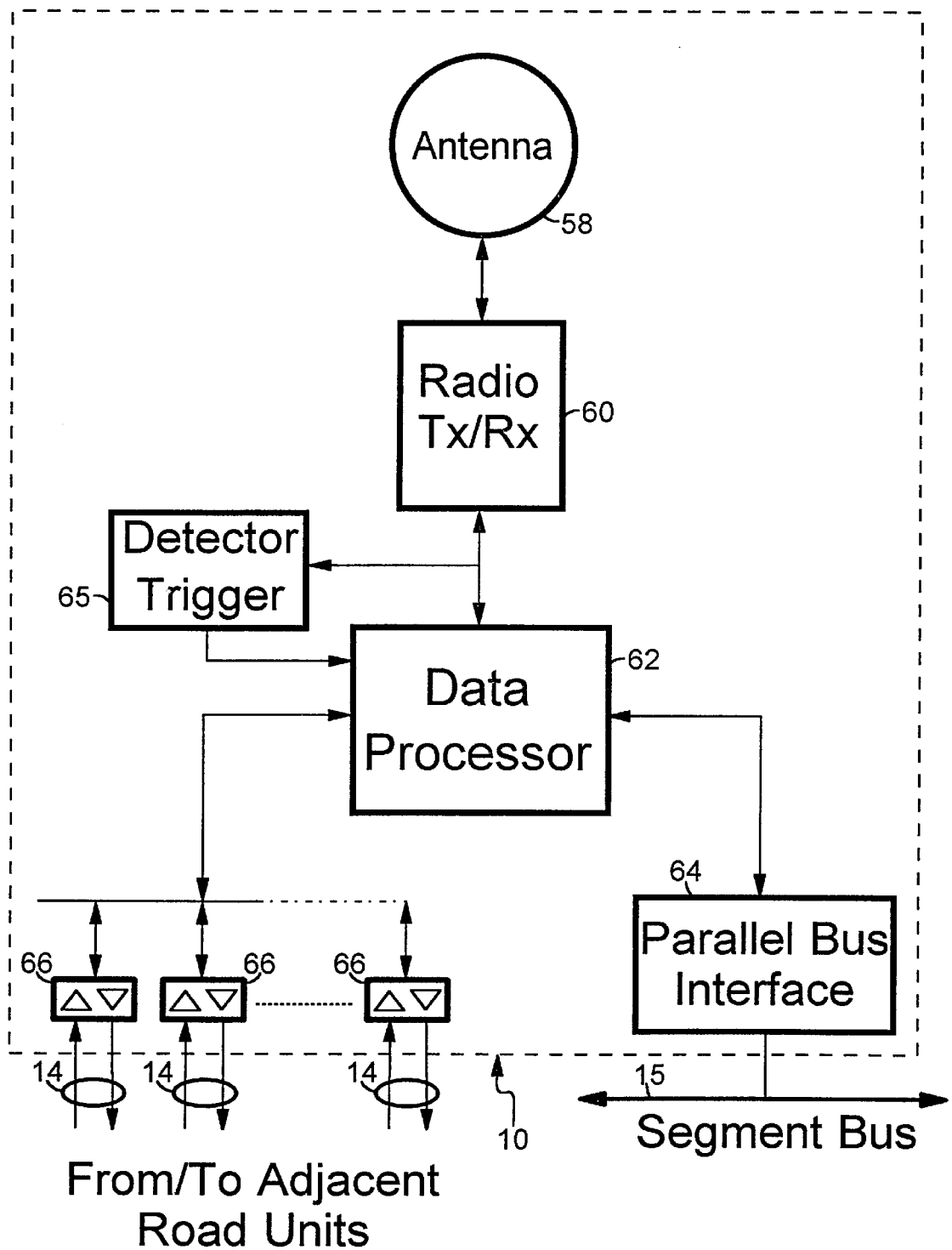
FIG. 5 is a block diagram illustration of a road unit constructed in accordance with a preferred embodiment of the present invention.

Referring now to FIG. 5, there is shown a road unit 10, constructed and operative in accordance with an embodiment of the invention. Each road unit 10 includes an antenna 58, a transceiver 60, typically a radio transceiver, and a data processor 62. Data processor 62 is also connected to a segment controller 30 via segment communications bus 15 and a parallel bus interface 64, and is further connected to at least two adjacent road units via two or more serial transceivers 66.

Road unit 10 typically does not transmit signals via transceiver 60 unless triggered by a probing signal emitted from a vehicle on-board unit 34. Accordingly, a detection and triggering device 65 is provided which is operative to activate road unit 10 so as to communicate with the on-board unit 34 and to instruct it to perform any of the vehicle functions described below.

Figure 6A:
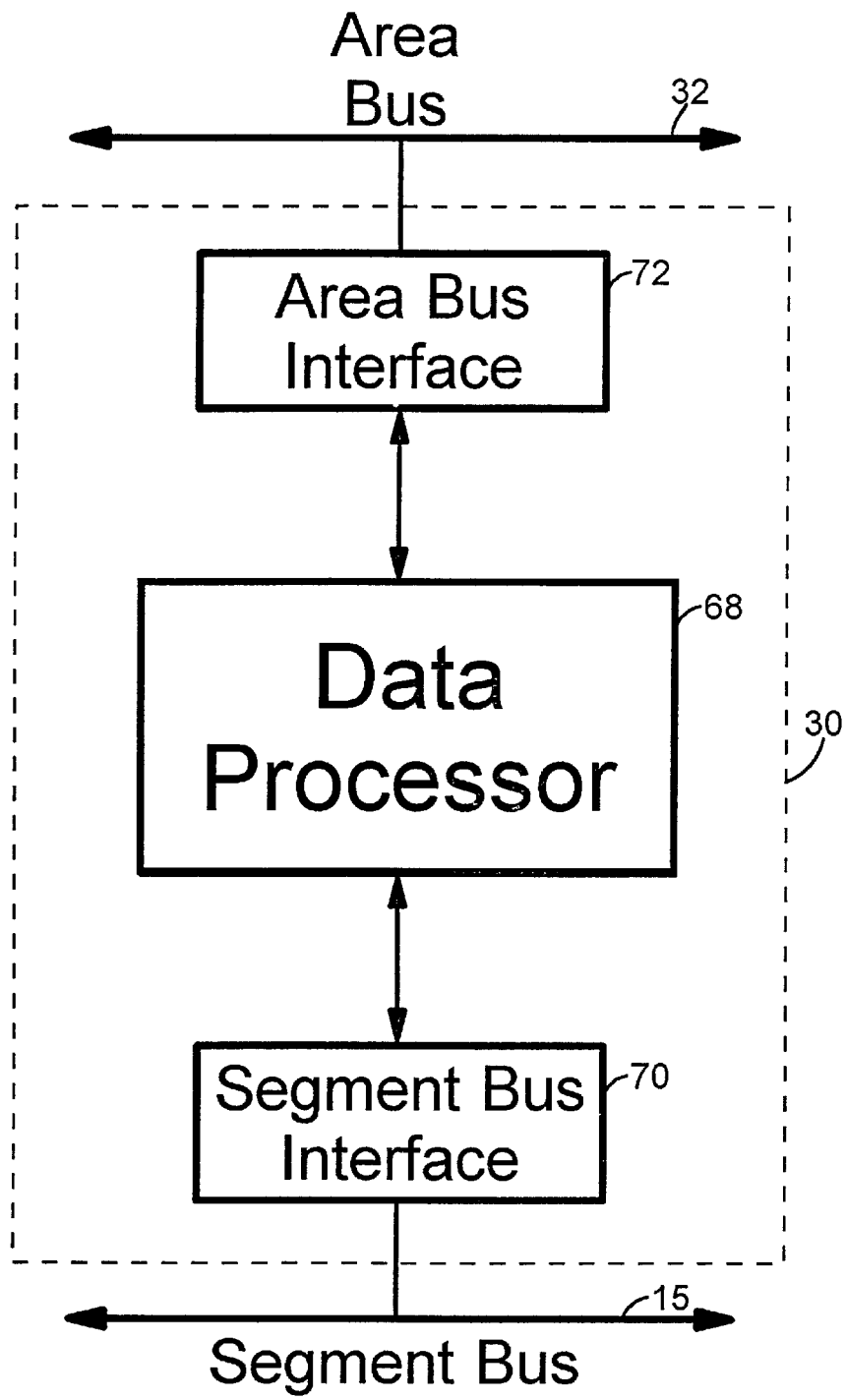
FIG. 6A is a schematic block diagram illustration of a segment controller shown in FIG. 1, in accordance with a preferred embodiment of the invention.
Figure 7:
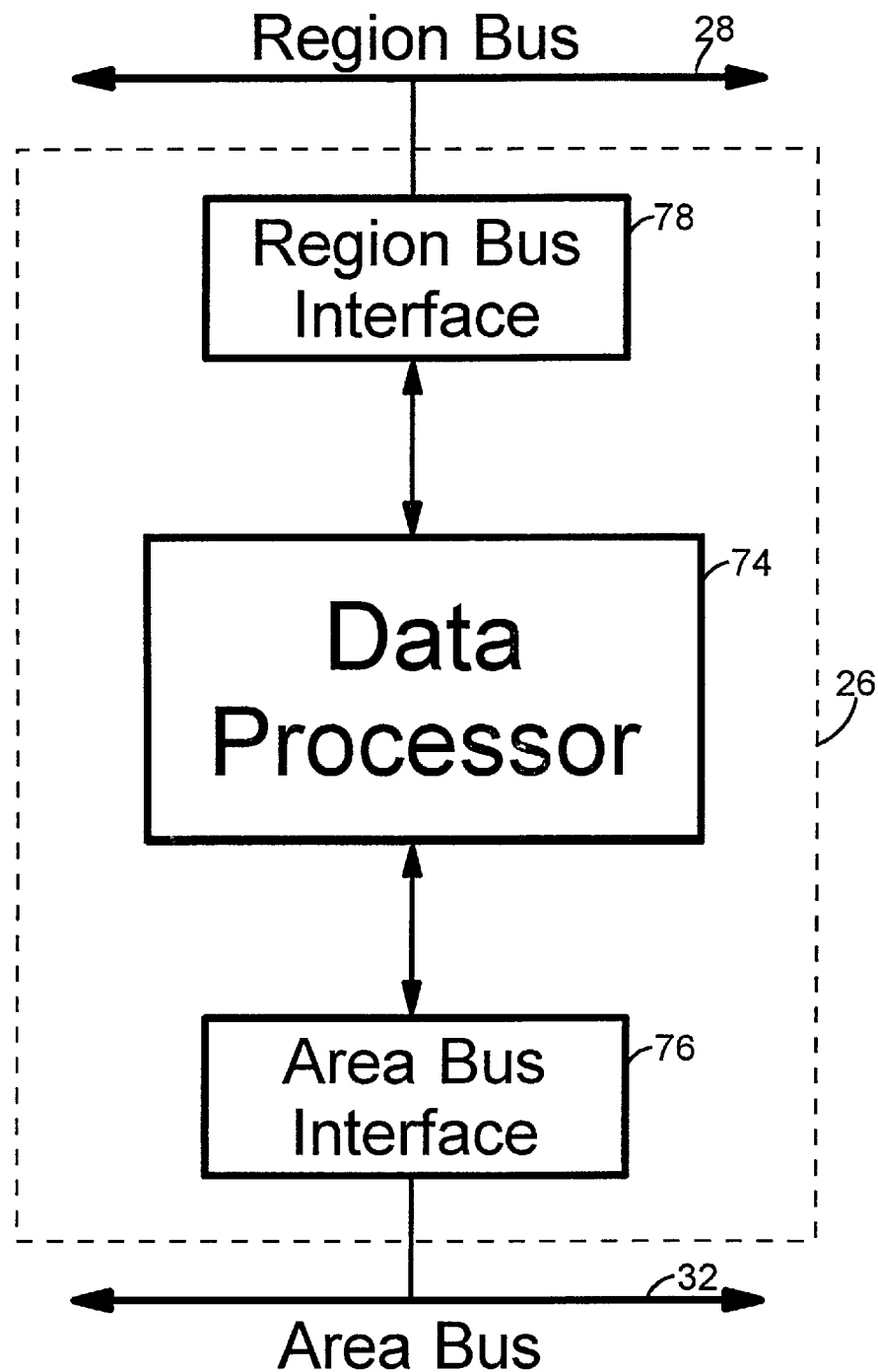
FIG. 7 is a schematic block diagram illustration of an area controller shown in FIG. 1, in accordance with a preferred embodiment of the invention.
Figure 8:
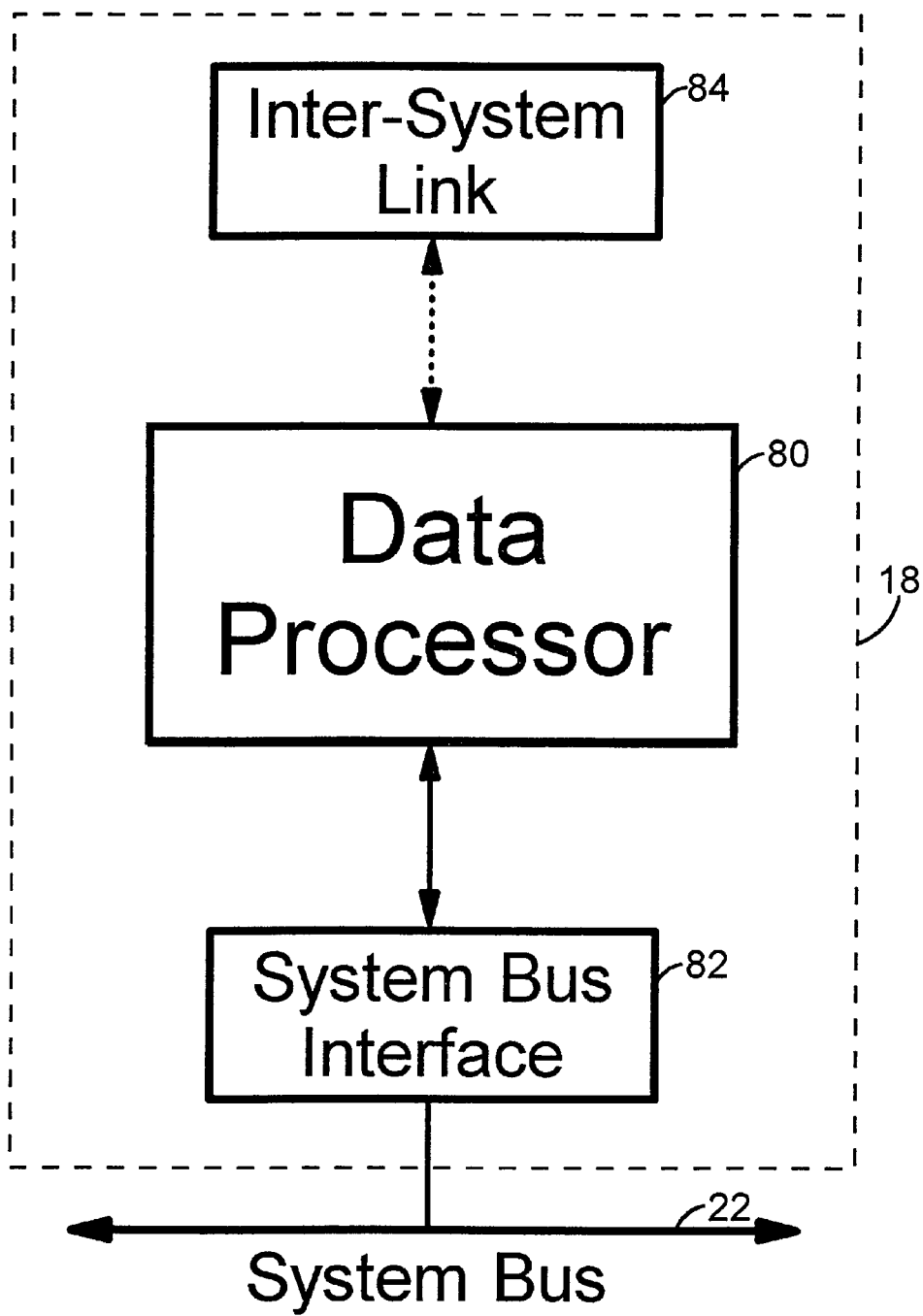
FIG. 8 is a schematic block diagram illustration of a system controller shown in FIG. 1, in accordance with a preferred embodiment of the invention.

Referring now briefly to FIGS. 6A, 7 and 8, there are respectively shown a segment controller 30, an area controller 26 and a system controller 18, forming essential communications links in the hierarchy of the communications network of the present invention.

In FIG. 6A it is seen that segment controller 30 has a data processor 68 which interfaces with segment bus 15 (also seen in FIG. 1) via a segment bus interface 70, and further interfaces with area bus 32 (also seen in FIG. 1) via an area bus interface 72.

With reference now to FIG. 7 it is seen that area controller 26 (also seen in FIG. 1) has a construction analogous to that of segment controller 30. Accordingly, area controller 26 has a data processor 74 which interfaces with area bus 32 (also seen in FIG. 1) via an area bus interface 76, and further interfaces with region bus 28 (also seen in FIG. 1) via a region bus interface 78.

The structure of system controller 18, shown in FIG. 8, is seen to be generally analogous to both that of segment controller 30 and area controller 26, having a data processor 80 which interfaces with system bus 22 (also seen in FIG. 1) via a system bus interface 82. It will be appreciated that system bus 22 may interface directly with region controller 20 (FIG. 1). However, depending on the requirements of an individual system, there may be one or more intervening levels of communications between system controller 18 and region controller 20.

In FIG. 8 it is also seen that an inter-system communications link 84 may be optionally provided, wherein a plurality of transport systems may be interconnected so as to exchange information between systems. This may be required over a very large area, such as a continental land mass, wherein effectively a single continuous network of roads may be governed by several systems constructed in accordance with the invention. While the communications between different hierarchical levels are typically by means of data buses, inter-system link 84 is preferably a telecommunications-type data exchange.

A method of effecting communications between segment controller 30 and its associated road units 10 is described below, in conjunction with FIGS. 1, 5, 6A and 6B.

In general, the length of a segment can be several hundred meters and even a number of kilometers. The number of road units 10 in any given segment can thus be between several hundred and several thousand. In order to facilitate rapid communications between each segment controller 30 and its associated road unit 10, a communications network between each segment controller 30 and its associated road units 10, characterized by the following:

All the road units 10 and their associated segment controller 30 are connected via appropriate interfaces 64 (FIG. 5), in parallel, to a single pair of wires which constitutes segment bus 15.

The segment controller 30 is the master of the segment bus 15, and all the road units 10 are slaves, such that most routine communications are governed by the segment controller 30. With the exception of certain predetermined situations, such as the emergency braking procedure, described hereinbelow in conjunction with FIG. 12, which is a quasi-reflexive procedure, the function of the road units 10 is to respond to vehicle on-board units 34 in accordance with instructions received from the controller 30.

Communication between controller 30 and its associated road units 10 is of necessity asynchronic. This is due mainly to different propagation times between road units located at different distances from the controller, and due to the fact that in order to conduct a sensible dialog between them, a given road unit and the controller have to receive complete messages from each other prior to responding.

A segment controller-road unit transmission includes the following parts:
A. A segment controller identification code.
B. The address or particular road unit or units to which the transmission is addressed. This can be any selected group of road units from a single specified road unit to the road units of the entire segment.
C. A message, containing information, instructions, or questions.

A road unit-segment controller transmission includes the following parts:
A. An identification code of the transmitting road unit.
B. An identification code of a vehicle for which the transmission (or report) has been generated. This does not apply in a situation wherein a transmission concerns non-vehicle related information, such as a report of faults, a self-check, and the like. Each type of information has its own predetermined code.
C. A message containing information, requests (from the driver) or questions.

When initiating a transmission to one or more road units 10, the segment controller 30 instructs a particular road unit or group of road units them what they are required to do. This may be routine reporting of vehicle travel, detailed reporting procedure, self-check procedure, change in function, and so on.

Figure 6B:
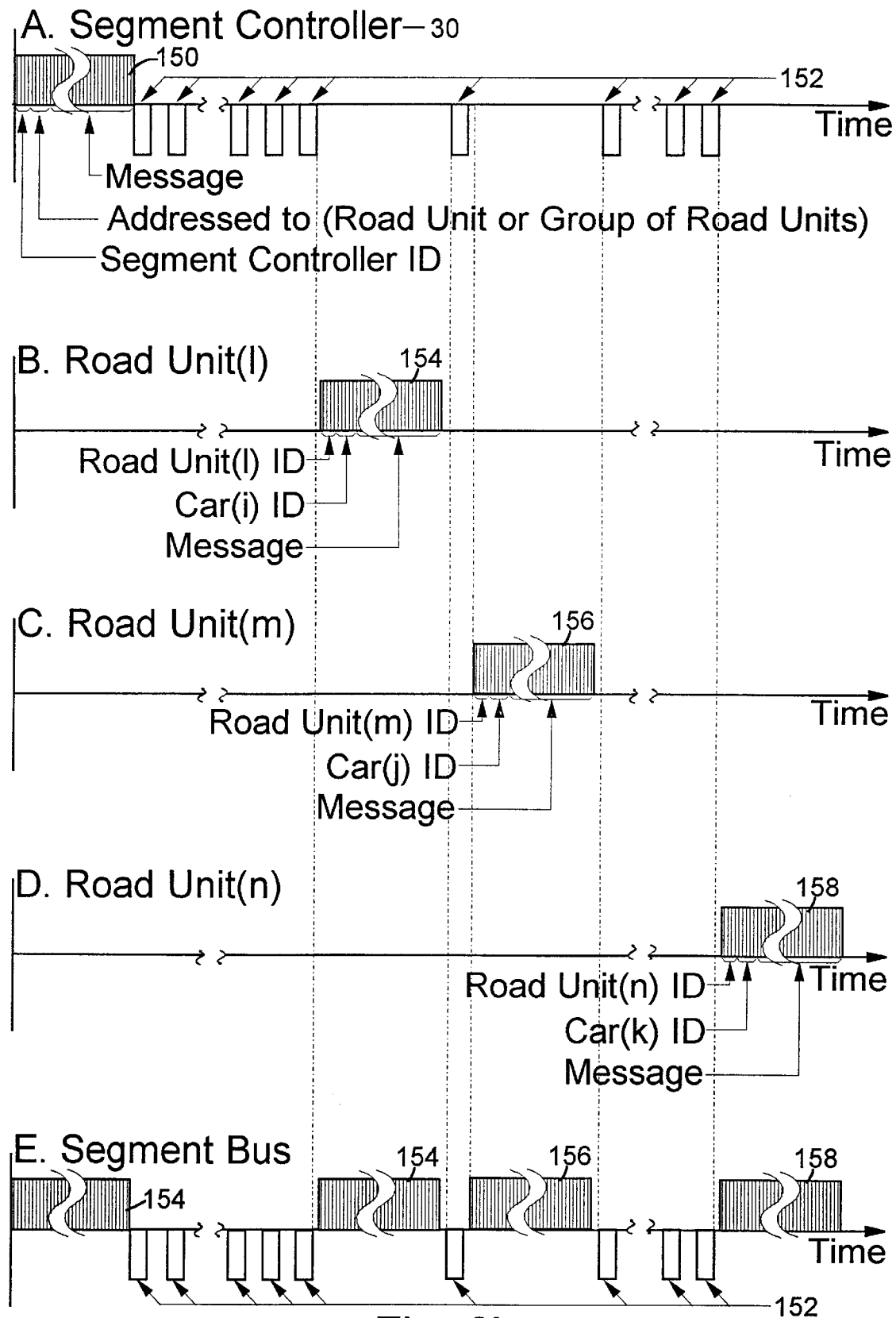
FIG. 6B is a diagrammatic representation of routine communications between a segment controller and the road units associated therewith.

As an example, the case of an instruction to all road units to proceed with routine reporting is described below in conjunction with FIG. 6B. FIG. 6B is divided into transmission plots A–E, wherein A is a plot of controller-road units transmissions, B, C and D are plots of road unit response transmissions, and E is a combined plot, showing all transmissions between the controller and the road units. An instruction transmission from the controller to the road units is indicated at 150 in plot A of the drawing.

Immediately upon termination of its instruction transmission 150, the segment controller 30 begins to transmit clock pulses 152, preferably of polarity opposite to that of the instruction transmission.

Each clock pulse advances the address counter in each road unit data processor 62.

Each time that the address counter of a given road unit advances, as described, the road unit checks if the address currently indicated by counter corresponds to its own personal identification number. Preferably, the road units in the segment are numbered sequentially.

If the address currently indicated by the counter is identical to its personal identification number, the road unit data processor 62 checks if it needs to pass on a message to the controller. If so, it will transmit its response, as seen at 154, 156 and 158 for respective road units "l", "m", and "n". If not, it will not respond as, in the presently described routine mode, if no vehicle has passed over the road unit since it previous report, it does not need to transmit.

After each clock pulse 152, the controller waits for an answer, it being appreciated that the waiting time is predetermined in accordance with the longest propagation time in the segment. When there is an answer, the controller ceases to transmit clock pulses 152 and receives the answer. The answer has a defined structure such that the controller 30 identifies its end.

Immediately after termination of the answer, the controller resumes transmission of the clock pulses 152.

It will be appreciated that, in the above-described communications procedure, all the road units in the segment are given the option of reporting.

It should further be noted that, in parallel to the above-described communications procedure, the controller processes the information received from the road units and decides how to continue.

It is thus seen that the transport system of the present invention is based on communications (radio or otherwise) between vehicles 16 (FIGS. 1, 4A and 4B) and a roadway-based communications network, substantially as described above in conjunction with FIGS. 1–8.

According to a preferred embodiment of the invention, road units 10 (FIGS. 1, 3, 4A and 4B) broadcast short transmissions only in response to a triggering or probing signal emitted by the transceiver 36 (FIG. 4A) of a vehicle on-board unit 34 passing above them. As described, transmissions between on-board unit 34 road units 10 contain information, and signals enabling centering of the vehicle 16 over the line units 10.

Typical operations of the system of the invention are now described, it being understood that these represent an example only of the capabilities and applications of the invention.

Prior to and during a journey by a vehicle 16 having installed therein an on-board system 34 (FIG. 4A), a human operator, referred to below as "driver", can enter a desired destination into data processor 38 via a suitable manual data entry device 39. Typically device 39 is a suitable keyboard, although other suitable types of device, such as joystick- or mouse-based devices or an oral instruction-responsive device may additionally, or alternatively, be employed for this purpose.

By means of the communications system constituted by the visual display unit 52 and speaker 54, the driver is provided with visual or audio-visual instructions which details a journey route recommended by the system, taking into account geographical knowledge of the road system, topographical, present traffic, roadwork, and weather considerations.

It will be appreciated that the system can also be programmed to take account of many additional factors. Accordingly, since the system has extensive and up-to-date knowledge of road conditions and other variables affecting the journey, it is able to plan a route and optimum speeds for any vehicle, taking into account factors which include, inter alia, safety, time and cost.

The driver may accept the suggestion of the system or enter another route as he wishes. If his choice is possible taking into account driving conditions, it will be confirmed by the system. From this moment the driver can enter an "automatic driving" instruction via data entry device 39, thereby to transfer the vehicle 16 to automatic driving and to allow the system to drive the vehicle to the destination.

The driver can take control of the vehicle at any time by entering a predetermined "manual driving" instruction accordingly. This can be done, for example, by manual operation of any of the vehicle controls.

Figure 9:
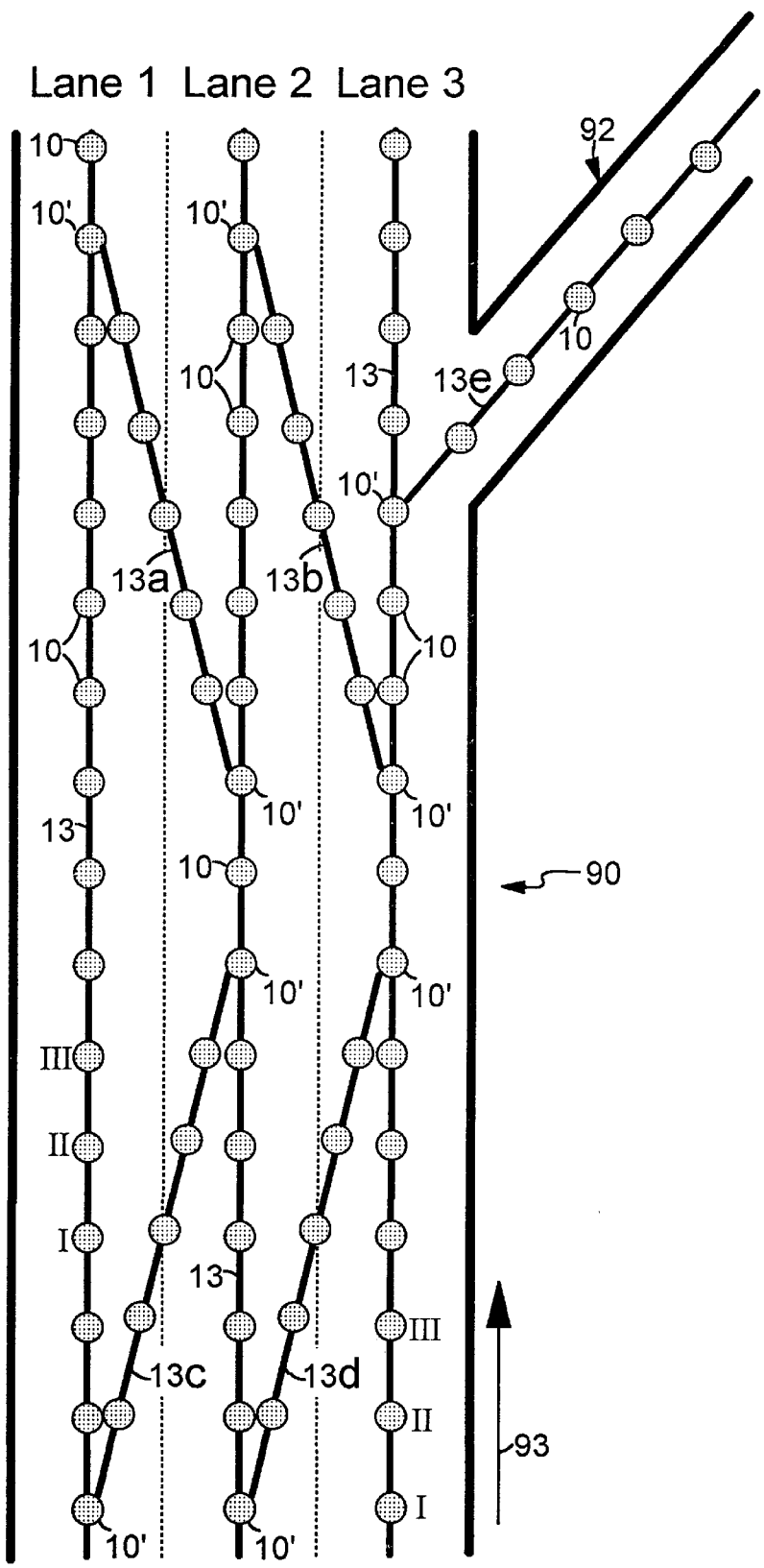
FIG. 9 is a diagrammatic illustration of a a multi-lane highway in which is employed the transport system of the present invention.

Referring now to FIG. 9, it is seen that a typical multi-lane highway, referenced 90, is divided into three lanes, labeled "lane 1", "lane 2" and "lane 3". Each lane has installed along its longitudinal axis, preferably beneath the surface thereof, a communications cable 13 (also seen in FIGS. 3, 4A and 4B). A predetermined length of communications cable 13, together with the road units 10 connected thereto, constitute a segment, substantially as described above in conjunction with FIGS. 1 and 2.

In addition to the main, centrally-located communications cables 13, there are also provided, in predetermined locations, branch communications cables, referenced 13a, 13b, 13c and 13d. These branch cables connect longitudinal cables 13 of parallel segments so as to enable passage of automatically controlled vehicles 16 (FIGS. 1, 4A and 4B) from lane to lane or, in terms of the system, from segment to segment. In addition, one or more communication cables 13e may also be provided along the ramp 92 in order to allow automated entry to/exit from the highway 90.

Figure 10:
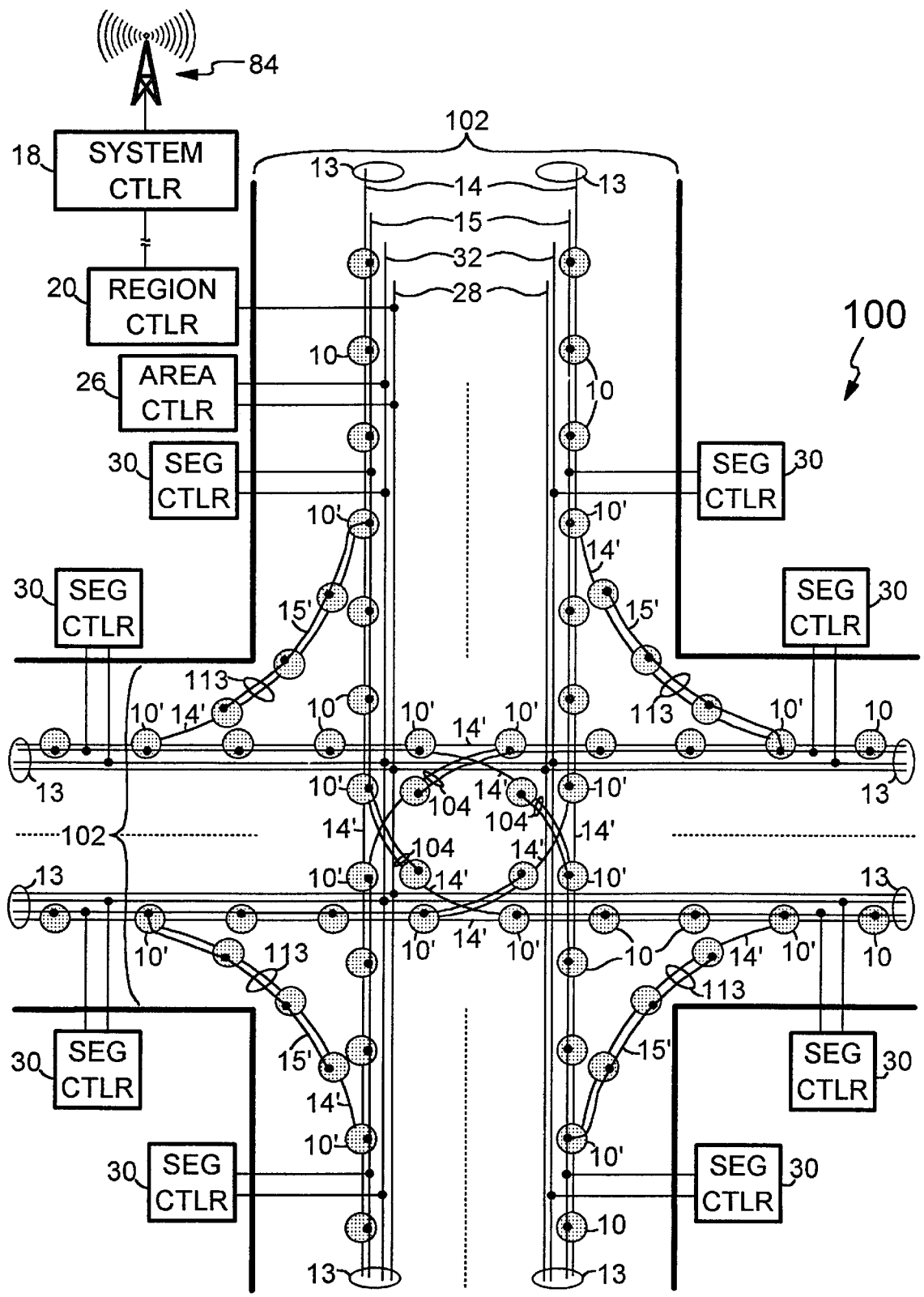
FIG. 10 is a schematic view of a four-way junction showing the layout of system components thereat.

Furthermore, as seen in FIGS. 1 and 10, there may also be provided inter-segment serial links, referenced 14', via which instructions or data can be transmitted from one segment to an adjacent segment. This may be needed, for example, when a vehicle is being navigated from one lane to another, or when turning, or to warn road units 10 and vehicles in adjacent segments of an emergency situation.

Accordingly, while virtually all of road units 10 are connected in series to two adjacent (upstream and downstream) road units, a plurality of nodal road units, referenced 10', are connected additionally to road units in an adjacent branch communications cable, thereby enabling passage of vehicles 16 from lane to lane. It will be appreciated, however, that "end" road units, referenced 10" in FIG. 1, are connected to a single road unit only.

Normally, the vehicles 16 travel along a certain route which the system has provided for them according to certain criteria, which include:

the maximum speed of each vehicle, the type or class of vehicle (trucks, private vehicles, public vehicles, and the like), and predetermined turns depending on the route selected.

Turns from one lane into another and between different roadways, such as exemplified in FIG. 3, are preprogrammed by the controllers at the various system levels, substantially as described above in conjunction with FIG. 1.

"Turn" instructions are transferred as instructions for action to the road units 10 via the various system levels and, ultimately, via the segment controllers 30 (FIGS. 1 and 6). Execution of turns in accordance with the turn instructions are managed "in the field" by the road units 10 and segment controllers 30. During execution of turns the road units 10 and segment controllers 30 take into account the operating conditions and spacing of vehicles in the vicinity of the turning vehicle, and how the turning of the turning vehicle will affect them.

"Unexpected" turns or stops are those which are neither planned nor executed by the system. Such turns are detected by the road units 10 and the system enters an emergency procedure, which may include stopping or diversion of other vehicles in the vicinity. Emergency procedures are described hereinbelow in conjunction with FIG. 12.

Referring now to FIG. 10, there is shown, in schematic form, the layout of system components at a four way junction, referenced generally 100. The junction 100 connects two pairs of intersecting lanes 102, and permits forward travel and right and left turns, by virtue of inner branch cables 104 and outer branch cables 106. Inner branch cables 104 enable a vehicle to turn while crossing a flow of opposing traffic, and outer branch cables 106 enable a vehicle to turn but wherein it is not required to cross a flow of opposing traffic.

As seen, each road unit 10 is connected to a pair of upstream and downstream road units via communications cable 13, while nodal road units 10' (also seen in FIG. 9) connect between a communications cable 13 and an associated branch cable 113. Branch cable 113 has substantially the same construction has cable 13. Each road unit 10 is further connected via segment bus 15 to an associated segment controller 30, it being further seen that each branch cable is similarly connected to a segment branch bus, referenced 15', thereby to form an integral part of a predetermined segment.

The remainder of the arrangement is substantially as described hereinabove in conjunction with FIG. 1. Accordingly, segment controllers 30 are connected to an area controller 26 via an area bus 32; area controllers 26 are connected (not shown) to region controller 20 via region bus 28; and a region controller is ultimately connected, via any intervening system levels, to system controller 18, which, in turn, may be connected to other system controllers via an inter-system link 84 (seen also in FIG. 8). In the present example, link 84 is shown as a radio transmitter.

Typical system data are as follows:

| | |
|---|---|
| Maximum vehicle velocity | Vmax = 200 kph |
| Minimum length of vehicle | Lmax = 3 m |
| Length of elliptical main communications antenna 56 (FIG. 4B) | Dd = 1.5 m |
| Longitudinal range (FIG. 4B) of | Ld = 3 m |

| | |
|---|---|
| capability of transmission and reception of data between the vehicle and a single road unit | |
| Possible time period for data communication between the vehicle and a single road unit | Td = Ld/Vmax = 54 ms |
| Diameter of centering antennae 44 (FIG. 4B) | Dc = 1.2 m |
| Longitudinal range of centering capability | Lc = 1.2 m |
| Possible centering duration time with respect to a single road unit | Tc = Lc/Vmax = 21.6 m |

Typical sizes of transmissions from the vehicle on-board unit 34 to a road unit 10 may be as follows:

| | |
|---|---|
| Size of a single transmission 'word' from the vehicle on-board unit 34 (FIG. 4A) to a road unit | Ctr = 100 bits |
| Size of an individual vehicle code - | Cid = 30 bits |
| Size of individual journey destinations | AD = 24 bits |
| Report on physical and operational vehicle parameters (dimensions, weight, sensors) | Cs = 10 bits |
| Size of miscellaneous messages | Cm = 46 bits |

Typical sizes of transmissions from a road unit 10 to a vehicle on-board unit 34 may be as follows:

| | |
|---|---|
| Size of a transmission 'word' from the road unit to the vehicle | Ltr = 100 bits |
| Size of an individual road unit code - | Lid = 30 bits |
| Size of an instruction to the vehicle | I = 30 bits |
| Size of miscellaneous messages | Lm = 40 bits |

A minimum transmission rate "Tr" from the vehicle on-board unit to a road unit and vice versa, is represented by the expression $Tr > 2*(Ctr+Ltr)/Tc$ and is in the order of 24 Kb/s. In practice this may be several orders of magnitude greater.

The time taken to transmit a message of 100 bits at a minimum transmission rate of approximately 24 Kb/s is represented by the expression $Dt=100/Tr$ and is approximately 4 ms.

It will be appreciated by persons skilled in the art that the above values are typical values only, serving to illustrate possible geometrical and operational parameters that may be desirable in the system of the present invention. The above values are in no way intended to represent operational limitations except where specifically stated as such.

Figure 11:
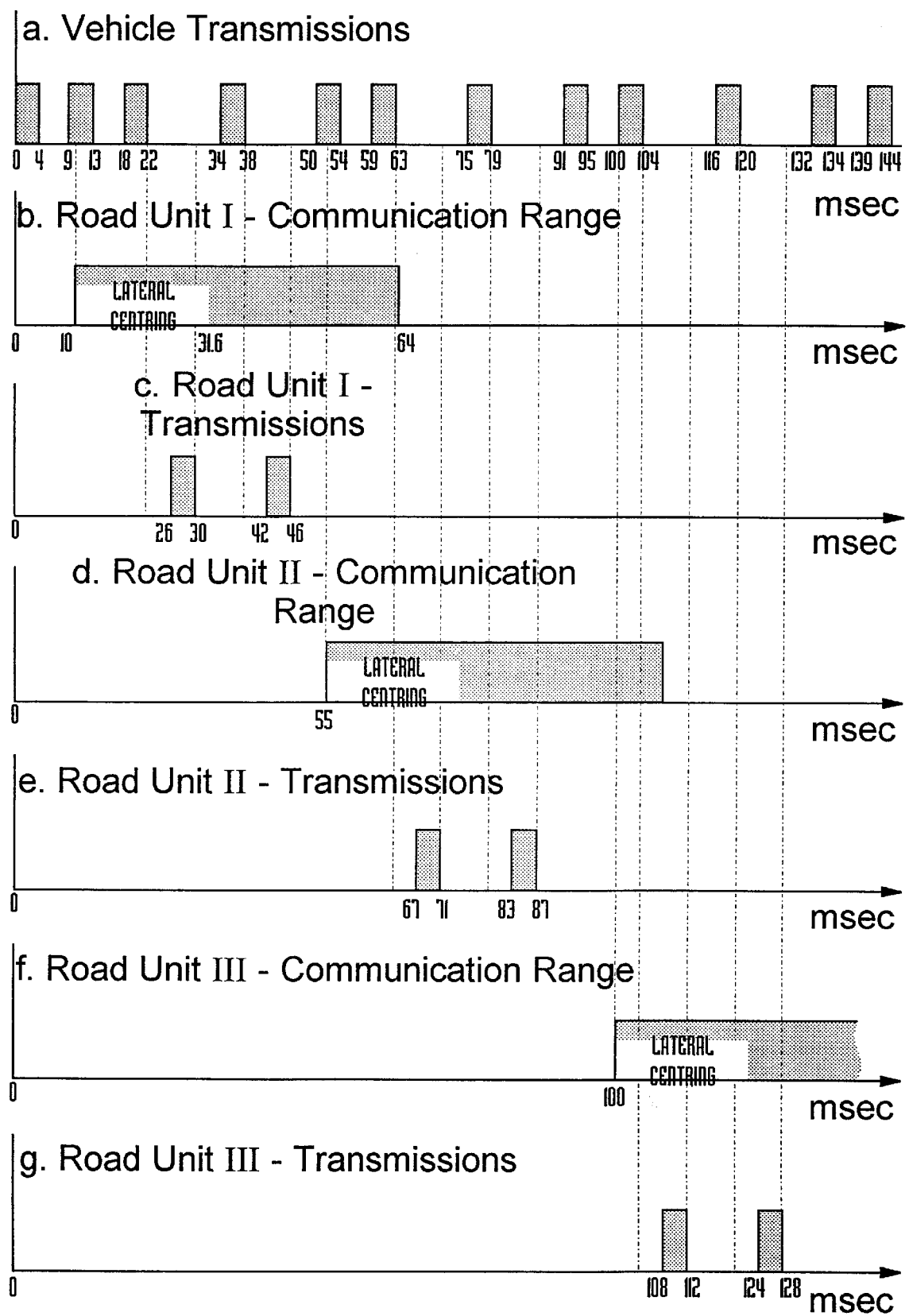
FIG. 11 is a series of graphs depicting communications timing between a vehicle traveling at a velocity of 200 kph and a series of road units of the system of the invention.

A "normal" communications mode between a vehicle on-board unit 34 and road units 10 is described below in conjunction with an example illustrated in FIGS. 9 and 11. A series of three road units 10 is indicated in FIG. 9 as being in Lane 3 of the illustrated highway. The three line units are further designated, for purposes of the present example, by reference numerals I, II and III, wherein the direction of travel of a vehicle (not shown) is taken to be from I towards III, as indicated by an arrow referenced 93. FIG. 11 is a series of graphs depicting communications timing between a vehicle traveling at a velocity of 200 kph and road units I, II and III. The graphs in FIG. 11 are as follows:
graph (a) shows actual vehicle transmissions,
graphs (b) and (c) show the communications range and actual transmissions, respectively, of road unit I,
graphs (d) and (e) show the communications range and actual transmissions, respectively, of road unit II, and
graphs (f) and (g) show the communications range and actual transmissions, respectively, of road unit III, In the above-mentioned normal mode, the road units 10 transmit only in response to detection of a transmission from on-board unit 34. When in operation, and in the absence of communications between on-board unit 34 and road units 10, the on-board unit 34 broadcasts "probing" transmissions, typically of about 4 milliseconds in length, every 9 milliseconds. This is seen in graph (a) in FIG. 11, wherein a four millisecond transmission is seen to be transmitted at 0, 9 and 18 milliseconds.

When a transmitting vehicle is located within communication range of a road unit antenna 58 (FIG. 5) or thereover, as illustrated in FIG. 4B, the road unit 10 is operative to detect a probing transmission from the on-board unit 34 so as to be "triggered" thereby. In response to being triggered in this manner, the road unit 10 responds with a broadcast lasting approximately 4 milliseconds, 4 milliseconds; after the broadcast of the on-board unit 34 has ended. This is seen in graphs (a) and (c) in which, at 26 milliseconds—4 milliseconds after the end of the first full transmission detected by the road unit—the road unit I transmits a 4 millisecond transmission.

If the road unit 10 receives an unidentified transmission (which is not compatible with the structure of the vehicle transmission) it does not respond. This can occur, for instance, when only part of a message is received due to the on-board unit 34 being out of range of the road unit antenna at the start of transmission. This is exemplified in graphs (a) and (b) wherein it is seen that, at the beginning of the second probing transmission from on-board unit 34, at 9 milliseconds, the vehicle has not yet entered the communication range of road unit I. Accordingly, as not all of the 9–13 millisecond pulse is detected by road unit I, it ignores the part-transmission and responds only to the subsequent 18–22 millisecond and 34–38 millisecond transmissions. Similarly, the 50–54 millisecond transmission is only partly received by road unit II, as seen in graph (d), and so a response therefrom—at 67–71 milliseconds (graph (e))—is provided only after detection of the next complete transmission, at 59–63 milliseconds.

As seen in graph (a), when the on-board unit 34 begins receiving the response from the road unit 10, it stops its regular transmissions. This change in transmission pattern is seen in response to the road unit I transmission at 26–30 milliseconds—graph (c), the road unit II transmission at 67–71 milliseconds—graph (e), and the road unit III transmission at 108–112 milliseconds—graph (g).

In the absence of further transmissions from the road unit 4 milliseconds after the end of a given transmission, the on-board unit 34 resumes its probing transmissions. This resumption to a regular probing transmission pattern is seen in response to the road unit I transmission at 42–46 milliseconds—graph (c), the road unit II transmission at 83–87 milliseconds—graph (e), and the road unit III transmission at 124–128 milliseconds—graph (g).

In the above-described 'normal' operational mode, each road unit converses with on-board unit 34 of a particular vehicle twice only. This is due to operational considerations, such as affected by vehicle speed and transmission rate. In certain predetermined cases, however, when the vehicle speeds are very low or when a large amount of information is to be transferred to the vehicle at an increased transmission rate, more than two exchanges between the on-board unit and each road unit may occur. The circumstances in which this happens are determined by controllers at various system levels in accordance with predetermined criteria.

The following points should be noted with respect to the above-described communications protocol:

A. Since the longitudinal communication range (3 meters) of the main antenna 56 of the on-board unit 34 is greater than the distance (2.5 meters) between the road units, there will always be a radio connection between the on-board unit 34 and a road unit, even when the vehicle stops.

B. The above-described procedure is a 'standard' procedure. In addition, the road units may perform various different functions, in accordance with certain situations as they arise. These situations are determined by the controllers at the various levels, and may include a self-check procedure, a procedure for operation when vehicles are traveling at low speeds, behavior at junctions, in traffic jams, and so on. In accordance with the circumstances and reception of an appropriate instruction from the controllers, the road unit switches from one functional mode to another.

The following are typical types of activity that may be performed while driving:

A. Entering a roadway so as to initiate contact between a vehicle 16 and road units 10.

B. Exiting a roadway so as to terminate contact between a vehicle 16 and road units 10.

C. Traveling in a lane.

D. Passing from one lane to another on a multi-lane road.

E. Exiting from a highway via an exit ramp.

F. Entering a highway via an entry ramp so as to merge with highway traffic.

G. Negotiating a four-way junction of two single lane roads, as shown in FIG. 10.

H. Negotiating traffic jams.

I. Emergency braking, as per the flow chart of FIG. 12.

Some of the above-listed types of driving activity are now described hereinbelow in detail by way of example.

Entering a roadway.

Prior to entering a roadway forming part of the system of the invention (the "roadway"), the on-board unit 34 has no (radio) connection with the system. Driving is therefore manual and carried out according to regular driving principles.

Just before entering the roadway, the driver activates the on-board unit 34 via switch 35 (FIG. 4A). After activation, unit 34 carries out a self-check procedure and notifies the driver of the results of the check. The messages to the driver are provided via visual display 52 and, optionally, via speaker 54. If the system self-check indicates no malfunction the driver is asked to enter a journey destination via data entry device 39.

The driver keys in his destination (the names of all geographical locations covered by the system are in the memory of the on-board data processor 38). The name of the destination is checked by the data processor and appropriate confirmation is given to the driver via display 52 and/or speaker 54.

The on-board unit 34 transmitter starts transmitting the transmission codeword or identification of the vehicle, via the main antenna 56 which is installed beneath the vehicle. Typically, the codeword, which also functions as the above-described probing transmission, is 100 bits long and is of 4 milliseconds duration. The code is transmitted regularly every 9 milliseconds until 'contact' is made with the system, as described above in conjunction with FIG. 11.

The driver drives the vehicle onto the road manually, with the center of the vehicle over the communications cable 13.

As soon as a road unit 10 detects receives the probing transmission so as to be triggered thereby, it responds immediately with a confirmation broadcast. From this moment, until the vehicle either leaves a roadway encompassed by the system of the invention, or unless the driver deactivates on-board unit 34 via switch 35, the system takes over driving of the vehicle.

The road unit 10 first encountered by the vehicle transfers the driver's destination request to the segment controller 30 (FIG. 1). If the destination is within the segment whereat the vehicle is located at the time of the request ("the vehicle segment"), the request is processed directly by the segment controller 30, which subsequently transmits an appropriate message via appropriate road units 10, back to the on-board unit 34.

If the destination is not within the vehicle segment, the segment controller 30 transmits the destination request, via an area bus 32, to an area controller 26. If the destination is within the vehicle area, the journey destination is processed by the area controller 26. If the journey destination is not within the vehicle area, the journey destination data is transmitted to controllers at successively higher levels in the system hierarchy, until the appropriate level of hierarchy is reached. Subsequently, output data corresponding to the journey destination is transmitted downward through the various system levels, until it is received by the on-board main antenna 56.

Accordingly, at the end of the processing process, the driver receives confirmation. The confirmation includes information regarding the selected route, the expected duration of the journey and other messages as necessary. The driver may either confirm, cancel or request changes in the route via data entry device 39.

After confirmation by the driver of a particular journey route, the controllers at the various levels transmit operational instructions to road units located along the route. These instructions may include the vehicle code, other vehicle particulars, estimated time of arrival at each road unit, navigational details, and speed of travel, as well as miscellaneous Instructions to the on-board unit 34 and messages to the driver.

The road unit 10 in the immediate vicinity of the vehicle then initiates transmittal of operational instructions to the on-board unit 34, and the vehicle which commences automatic travel.

Exiting a roadway.

Prior to reaching a predetermined exit location from the roadway, from where manual driving will be required, the driver receives a warning message via display 52 and/or speaker 54 of the impending exit. The on-board unit 34 subsequently reduces the driving speed of the vehicle to manual driving level.

As the vehicle is above the last road unit prior to exit, they exchange a final transmission, confirming the status of the vehicle upon exit, and the vehicle then goes over to manual control by the driver. The status of the vehicle upon exit is then transmitted to the segment controller 30, and from there to higher levels in the system, as required.

Traveling in a lane

As the vehicle travels along a lane portion of a roadway, as seen, for example, in FIGS. 3 and 9, the route particulars of the vehicle are transferred from the controllers at the various levels to the road units 10. Accordingly, each road unit 10 stores in its memory (data processor 62) the data of each vehicle expected, in arrival order (FIFO). The size of the road unit memory determines the number of vehicles it is possible to store. Vehicle journey data may be updated via the segment controller 30 (FIGS. 1 and 6) when necessary. The data may include, inter alia, the vehicle identification or codeword, estimated time of arrival, average expected journey speed, navigational instructions, as well as any further instructions to the on-board unit 34 and miscellaneous messages to be transmitted to the driver.

As described above in conjunction with FIG. 11, the road units 10 are in a standby mode until a valid transmission (transmission structure, coding method, and so on) is received from a vehicle. Once a valid transmission from a vehicle on-board unit 34 is received, the receiving road unit checks data received from the on-board unit 34, including the vehicle codeword or identification number, vehicle data, and miscellaneous messages.

If the identification number is invalid, unclear or not as expected, the road unit waits for the second transmission from the on-board unit 34. If the identification number is incorrect in the second transmission as well, the road unit enters an emergency braking procedure. This is described below in conjunction with FIG. 12.

If the identification number is valid, clear and correct, the road unit data processor 62 processes the messages. These messages may include a request for change in route, a request for specific geographic, commercial or any other general type of information, transfer of messages to stationary stations such as a private or business address. The messages are transferred for action to the segment controller 30, which either processes them and responds directly, or transmits the messages to a higher system level.

A further function of the road units is to check if the actual vehicle arrival time is as expected. If not, data processor 62 calculates a required change in speed, and instructs on-board data processor 38 (FIG. 4A) accordingly, which then acts to change the speed via control interface 40. If the difference between actual and required speed is greater than a value predetermined in accordance with criteria such as, the speed of travel in the segment, planned distances between vehicles, safety conditions in the segment, the emergency braking procedure may be initiated.

Subsequently, the road unit transmits a response to the vehicle on-board unit 34. The response may include instructions generated by the road unit, such as, change of speed, emergency braking and the like, and instructions and messages from the segment controller, such as, average journey speed so far, navigational instructions, and miscellaneous messages.

In addition to the transmissions from a given road unit to a given vehicle on-board unit, the road unit also transmits a message via serial link 14 to the next (downstream) road unit in the direction of travel. The message includes, inter alia, the identification number of the vehicle next scheduled to reach it and how long it will take to arrive or "instantaneous arrival time." The instantaneous arrival time is based on the actual speed of the vehicle as it passes the transmitting road unit and any speed change or navigational instructions, and is thus different from the estimated time of arrival according to the travel plan, as transmitted to the receiving road unit by the segment controller.

As a further safety precaution, the downstream road unit constantly checks if the vehicle which has just left the upstream road unit, and which should reach the downstream road unit in a given time, has indeed arrived as expected. If the vehicle is found not to have arrived within the expected time period, the road unit enters the emergency braking procedure.

The upstream road unit stores various predetermined types of data of the vehicle which has passed in its memory. For this purpose it can use the same place in its memory on which were written the data it transmitted to the on-board unit 34 and which it no longer needs.

Each road unit transfers messages to its segment controller 30 via parallel communications bus 15 (FIG. 1) in accordance with a predetermined procedure. The messages include, inter alia, a report on the passage of vehicles and messages associated with each vehicle; information concerning special occurrences, such as, emergency braking; service requests of the road unit itself, for instance, a request for memory update; messages concerning faults in the line; and so on.

Figure 12:
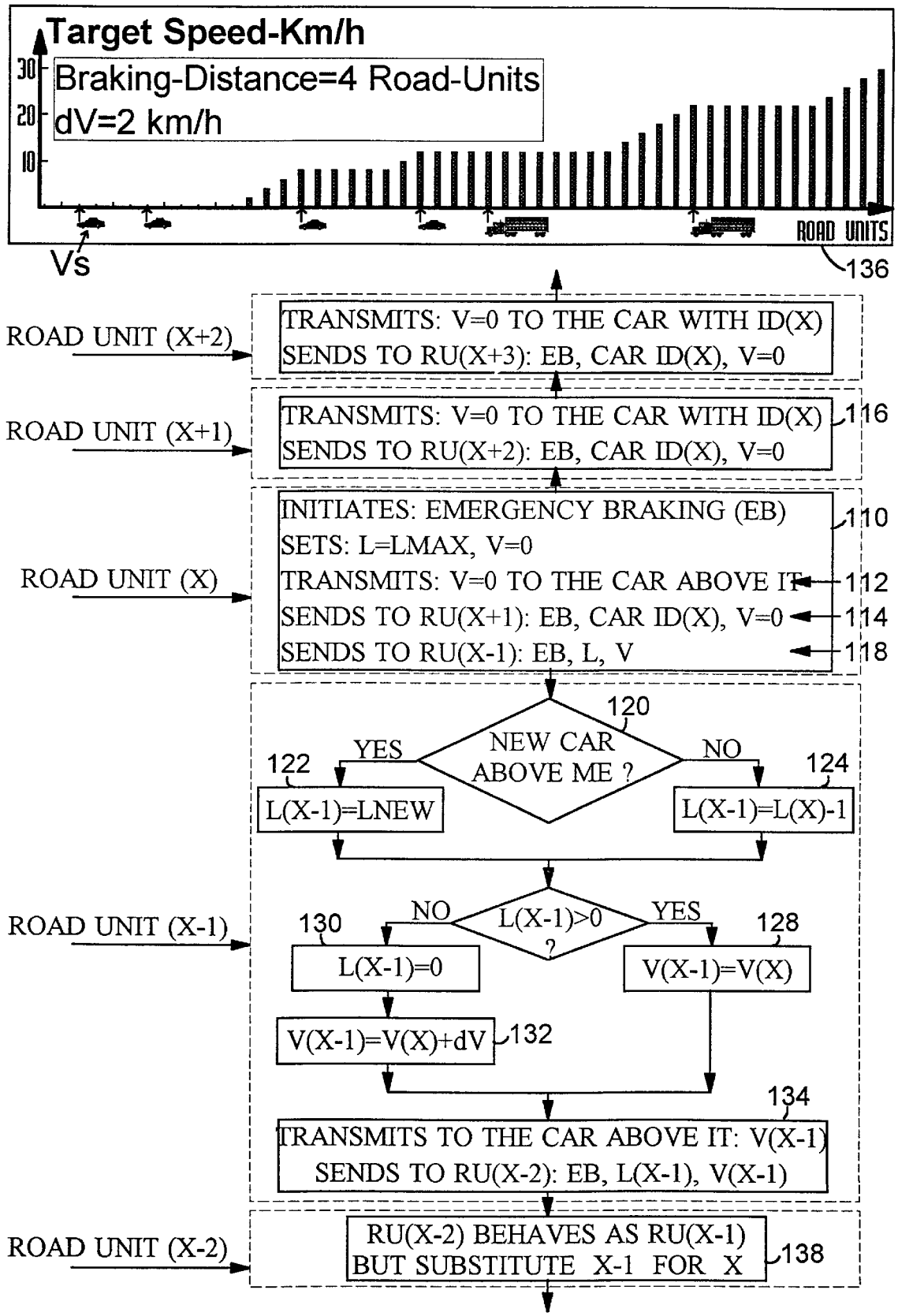
FIG. 12 is a flow chart diagram of an emergency braking procedure, in accordance with an embodiment of the present invention.

Reference is now made to FIG. 12, which is a flow chart diagram of an emergency braking procedure, in accordance with an embodiment of the invention.

Emergency braking of one or more vehicles may be initiated by the system, in response to a plurality of predetermined conditions listed below; by one or more road units 10 as a reflexive response to various predetermined situations, for example, if a vehicle does not reach a specific road unit within an expected time period, or if the vehicle is found to be malfunctioning; or by the driver. Typically, if the driver wishes to stop, entry of an appropriate instruction to on-board unit 34, either via data entry device 39 or by depressing the vehicle brake pedal, for example, will cause the system to enter an emergency braking procedure.

Conditions in response to which the system initiates emergency braking include the following:
- a deviation from the journey schedule greater than permitted,
- a deviation from the order of travel of a group of vehicles,
- reports by drivers on emergency situations.

A typical emergency braking procedure is as follows:
1. A road unit "X" in communication range with a vehicle to be stopped transmits (block 110, line 112) an instruction to the vehicle on-board unit 34 to reduce the velocity V of the vehicle to V=0. The vehicle to be stopped is denoted as vehicle "Vs" in FIG. 12.
2. Road unit X transmits (block 110, line 114) a message via serial link 14 to an adjacent downstream road unit "X+1"— if road unit X is an upstream nodal unit (i.e. branching downstream of road unit X) then the message is transmitted to both downstream road units. The message includes an instruction to stop the vehicle about to reach the downstream unit, together with the identification number of the vehicle.

As stopping does not occur instantaneously, unit X+1 informs (block 116) the subsequent downstream road unit "X+2" to continue stopping the vehicle. In this way, successive downstream road units continue to inform those ahead of them to stop the specified vehicle until it is brought to a complete halt. If there is another vehicle, which has no connection with the emergency braking, downstream of the vehicle for which the stopping procedure was initiated, it will continue to travel normally.

3. Road unit X transmits (block 110, line 118) a message along serial link 14 to the road unit "X−1" immediately upstream thereof—if road unit X is a downstream nodal unit (i.e. branching upstream of road unit X) the message is transmitted to both adjacent upstream road units.

The message includes the following instructions:
a. go over to emergency braking procedure;
b. my safety range is distance L, wherein L is measured in road units and equals Car Length+Braking Distance, and wherein Braking Distance is determined by the system in accordance with the safety conditions of the roadway where the braking is being performed; and c. the maximum permitted speed of travel over me (i.e. unit X) is V which, at initiation of the braking procedure, equals 0.

4. The road unit X−1—upstream of road unit X—then performs the following calculations:
   a. if there is a new vehicle (different from the previous one) in communication range of unit X−1 (block 120), then L=New Car length−Braking Distance (block 122); if there is no new vehicle above unit X−1 then L=L−1 until L reaches zero (block 124).

If L>0 then V remains unaltered (block 128);

if L=0 (block 130), then V=V+dv (block 132), wherein dV is a predetermined speed increment set in advance by the controllers according to safety considerations on the particular road—V cannot be greater than Vmax defined for the particular road according to the above considerations.

5. Road unit X−1 transmits (block 134) the following:
   a. a message to the vehicle immediately above, informing it of its current speed; and
   b. a message to the immediately upstream road unit "X−2", as follows:
      execute emergency braking procedure, my safety range is L (according to calculations above), the permitted maximum speed of travel in my vicinity V (as defined above).

In this way, if there is a gap between the first vehicle (which is stopping) and those behind it, the force of the stopping will be reduced gradually. This is indicated in the graphical representation of target speed versus distance (in terms of road units) shown at block 136 in FIG. 12. It is seen that speed is reduced gradually as successive upstream vehicles travel downstream toward the road unit X that initiated the braking procedure.

6. The third and subsequent upstream road units X−2, . . . n, X−n, operate (block 138) in a manner similar to that described for road unit X−1.

It will be appreciated by persons skilled in the art that the scope of the present invention is not limited by what has been shown and described hereinabove, merely by way of example. Rather, the scope of the invention is defined solely by the claims, which follow.

I claim:

1. A transport system which includes:
   a network of intersecting travel routes (12) having associated therewith a corresponding network of road-based communications units (10) therealong;
   a plurality of vehicles (16) for travel along said network of intersecting routes; and
   a control and communications system for controlling travel of said vehicles along said network,
   wherein the network is characterized by subdivision into a plurality of contiguous segments, and
   wherein the control and communications system is characterized by being a decentralized, hierarchical modular system providing real-time individualized control of each said vehicle within said network and guidance thereof to a selected travel destination while taking into account the operational status and guidance of others of said vehicles traveling within said network, and said control and communications system includes:
      at least first, second and third hierarchical intercommunicating levels of control and communications, wherein
         said first level includes vehicle mounted on-board control and data exchange apparatus (34);
         said second level includes a plurality of said road-based units arranged in series along each said segment such that each said road-based unit located along a selected travel route is operative, in turn, to establish two-way communications with said on-board control and data exchange apparatus (34) of each said vehicle traveling therepast,
         said on-board control and data exchange apparatus (34) being further operative to utilize said two-way communications for providing lateral and longitudinal positioning of said vehicle relative to a travel route; and
         said third level includes a plurality of intercommunicating network segment control units (30) for data processing and two-way communications with each of said road-based units in a corresponding plurality of predetermined network segments,
      wherein said on-board control and data exchange apparatus (34) is operative to selectably sense and control operational functions of said vehicle so as to permit automated guidance thereof to a selected travel destination, and said two-way communications between said on-board control and data exchange apparatus (34) and said road-based units in proximity therewith includes at least transmission therebetween of mutual identification data and transmission of vehicle operating data from said on-board apparatus (34) to said road-based units, and
      wherein said on-board control and data exchange apparatus (34) is operative to maintain two-way communications with at least one of said road-based units (10) at all times during vehicle operation, and each said segment control unit includes:
         interface apparatus (70) for exchanging with each of said plurality of said road-based units located in each said network segment at least identification and operation data of each said vehicle traveling in a selected network segment in proximity to said plurality of road-based units therein; and
         apparatus (68) for evaluating optimal travel parameters for each said vehicle,
         wherein said interface apparatus is operative to transmit to said road-based units vehicle operation commands for each said vehicle proximate thereto, in accordance with said optimal travel parameters,
         wherein said road-based units are operative to transmit said vehicle operation commands to said vehicle traveling in proximity thereto, and
         wherein, in response to reception of vehicle operation data, said apparatus for evaluating optimal travel parameters is operative to re-evaluate said travel parameters and to update said vehicle operation commands in accordance therewith.

2. A transport system according to claim 1, and further including at least a fourth hierarchical level of control and communications which includes at least one super control unit (26) for data processing and two-way communications with a plurality of segment control units which together control operation of vehicles in an area containing a predetermined contiguous plurality of said network segments, wherein
   each said segment control unit further includes additional interface apparatus (72) for exchange, via parallel bus apparatus (32), between said segment control unit (30) and said super control unit (26), of additional vehicle-related data which, in accordance with predetermined criteria, can influence the evaluation of said travel parameters of other vehicles traveling in any part of the area containing said predetermined contiguous plurality of said network segments, and each said super control unit (26) includes:

interface apparatus (76) for exchanging with said plurality of segment control units, said additional vehicle-related data; and apparatus (74) for processing said additional vehicle-related data so as to provide further travel data, wherein said interface apparatus (76) of said super control unit is operative to transmit to said interface apparatus (72) of each said segment control unit said further travel data relevant to the evaluation of said optimal travel parameters of vehicles traveling in said network segment associated therewith.

3. A system according to claim 2, wherein said system includes yet a further plurality of hierarchical control levels, each having a plurality of said super control units for controlling vehicles in a predetermined region containing a plurality of contiguous areas, each said level being operative to control a control level immediately therebeneath in the hierarchy, each said hierarchical control level including:

at least one communication apparatus for selectably communicating with a control level immediately therebeneath in response to reception of input signals therefrom; and at least one data processing apparatus, connected to each said communication apparatus of said hierarchical control level, for processing input data corresponding to said input signals, and for providing output data for transmission by said communication apparatus to the control level immediately therebeneath in the form of output signals.

4. A system according to claim 1, wherein said apparatus for evaluating optimal travel parameters (68) is operative to provide vehicle operating data, for a plurality of vehicles, to a plurality of said road-based units (10) located along respective travel paths of said plurality of vehicles, and each said road-based unit (10) is operative to store said vehicle operating data, and is further operative, in response to receiving the identity of each said vehicle from said on-board apparatus (34) thereof, to provide thereto said vehicle operating data for said vehicle associated therewith.

5. A system according to claim 1, wherein each said road-based unit is connected, via parallel communications apparatus (64) and parallel bus apparatus (15), to a predetermined one of said segment control units (30) and wherein each said road-based unit includes;

transceiver apparatus (60);

antenna apparatus (58) for facilitating communications between said on-board apparatus (34) and said transceiver apparatus (60); and data processing apparatus (62), associated with said transceiver apparatus (60), for receiving data from and for sending data to said on-board apparatus (34), for exchanging data with an associated segment control unit (30) via said parallel communications apparatus (64) and said parallel bus apparatus (15), and for processing the data received from said on-board apparatus (34) and from said associated segment control unit (30) via said parallel communications apparatus (64) and said parallel bus apparatus (15), and for processing the data received from said on-board apparatus (34) and from said associated segment control unit (30).

6. A system according to claim 5, wherein each said road-based unit is further connected, via a serial bus (14), to at least one adjacent road-based unit, wherein each said road-based unit also includes additional transceiver apparatus (66) for exchanging data between said at least one adjacent road-based unit.

7. A system according to claim 6, and including a cable construction (13) which contains at least a plurality of said road-based units (10), said serial buses (14) therebetween, and said parallel bus apparatus (15,32).

8. A system according to claim 6, and also including serial bus apparatus (14') connecting between preselected road-based units of adjacent segments, wherein a first road-based unit of a first segment is operative to exchange with a second road-based unit of a second segment, via said serial bus apparatus (14'), data relating to vehicles traveling from said first segment to said second segment, thereby to facilitate continuous control of said vehicles by said system.

9. A system according to claim 5, wherein said on-board control and data exchange apparatus (34) and each said road-based unit are selectably operable in either a first, fully automatic mode or in a second, non-fully automatic man-in-the loop mode.

10. A transport system according to claim 1, wherein said on-board control and data exchange apparatus (34) of each said vehicle includes:

transceiver apparatus (36) for communicating with each of said plurality of road-based units (10) in series while traveling therepast;

data processing apparatus (38) connected to said transceiver apparatus (36); and control apparatus (40), connected to said data processing apparatus for selectably controlling and sensing any of a predetermined plurality of vehicle operating functions in response to signals received by said transceiver apparatus (36) from said road-based units, wherein said road-based units are arranged along a predetermined path along said travel route and are operative, in conjunction with said on-board apparatus (34), to enable a predetermined positioning of said vehicle relative to said predetermined path.

11. A system according to claim 9, wherein said interface apparatus (70) of said segment control unit (30) is operative to transmit to said data processing apparatus (62) of each said road-based unit (10) located along the travel paths of a plurality of vehicles, travel data relating to each said vehicle, such that each said road-based unit is operative to anticipate the arrival of vehicles of known identities.

12. A system according to claim 10, wherein said on-board control and data exchange apparatus (34) also includes first antenna apparatus (44) mounted in a predetermined position on said vehicle and associated with said data processing apparatus (38), and a second antenna apparatus for each said road-based unit, wherein a predetermined one of said first and second antenna apparatus includes a pair of antennae arranged in a predetermined, orientation and having receiver apparatus (50) and comparator apparatus (48) associated therewith, for providing an output indication of the position of said vehicle relative to said predetermined path.

13. A system according to claim 12, wherein said pair of antennae (44), said receiver apparatus (50) and said comparator apparatus (48) form part of said on-board control and data exchange apparatus (34) of said vehicle, and are connected to said data processing apparatus (38) thereof.

14. A system according to claim 13, wherein the longitudinal spacing between adjacent road-based units is of smaller magnitude than the longitudinal reception range of said on-board control and data exchange apparatus (34), such that said on-board apparatus (34) is always in communications range of at least one road-based unit along its travel route.

15. A system according to claim 12, wherein said pair of antennae and said comparator apparatus are operative to provide signals to said data processing apparatus indicating the degree of alignment of said vehicle along said predetermined path.

16. A transport system according to claim 15, wherein said on-board control and data exchange apparatus (34) also including a main communications antenna (56) connected to said transceiver apparatus (36), for receiving and transmitting data messages between said data processing apparatus (38) and said road-based units.

17. A transport system according to claim 16, wherein said road-based units (10) are operable in different operative modes, and said apparatus for evaluating optimal travel parameters (68) of said segment control unit (30) is also operative, via said interface apparatus (70), to selectably control said road-based units (10) so as to switch them between one operative mode and another.

18. A system according to claim 10, wherein said data processing apparatus (38) is operative, via said transceiver apparatus (36), to provide signal outputs to said road-based units, said signal outputs including messages of a type selected from the group which consists of vehicle identification data;

messages indicative of vehicle operation parameters;

messages indicative of driver-vehicle inputs; and driver-initiated data inquiry messages.

19. A system according to claim 18, wherein said road-based units are operative to receive signal outputs from said transceiver apparatus (36) of said on-board apparatus (34), and are further operative to process data contained in the received signal outputs, and to selectably transmit at least a portion of the data to an associated segment control unit (30), and said apparatus for evaluating optimal travel parameters (68) of said segment control unit is operative to selectably communicate with each of said plurality of road-based units, via said interface apparatus (70), in response to reception of input signals therefrom; and said apparatus (68) for evaluating travel parameters is further operative to provide said vehicle operation commands to said road-based units in the form of output signals.

20. A system according to claim 19, wherein each of said road-based units is operative, in response to detection of passage of said vehicle, to transmit an output signal to at least an immediately adjacent downstream road-based unit, indicating travel of said vehicle toward said downstream unit.

21. A system according to claim 19, wherein said network of travel routes also includes forks which diverge from nodal road-based units (10'), each said nodal road-based unit being arranged in generally equidistant relationship from a pair of immediately adjacent road-based units (10) located downstream along divergent paths, and wherein each said nodal road-based unit (10') is operative, in response to detection of passage of said vehicle, to transmit an output signal to at least said pair of immediately adjacent downstream road-based units, indicating travel of said vehicle towards one of said pair.

22. A system according to claim 19, wherein said network of travel routes also includes junctions, and wherein each said vehicle is guided through the junction by said control and communications system.

23. A system according to claim 22, wherein said junctions include multi-directional junctions having at least three entry lanes and three exit lanes.

24. A system according to claim 19, wherein each of said road-based units is operative, in response to at least one of vehicle operation parameter values and driver-vehicle input values outside of a predetermined range, to automatically transmit an emergency indication directly to at least one adjacent road-based unit, and wherein each said at least one adjacent road-based unit is operative, in response to receipt of said emergency indication, to provide a control signal to said transceiver apparatus (36) of said on-board control and data exchange apparatus (34) in accordance with said emergency indication.

25. A system according to claim 24, wherein said road-based units to which the emergency indication is transmitted are operative also to provide control signals to said transceiver apparatus (36) of said on-board control and data exchange apparatus (34) of a plurality of said vehicles whose travel data are affected by the vehicle whose parameter values or input values are determined to be outside the predetermined range.

26. A system according to claim 24, wherein said at least one adjacent road-based unit is operative, in response to reception of the emergency indication, to transmit a velocity control signal to said vehicle on-board apparatus (34).

27. A system according to claim 25, wherein a plurality of upstream road-based units and a plurality of downstream road-based units, relative to said automatically transmitting road-based unit, are operative to activate road-based units immediately adjacent thereto so as to transmit velocity control signals to a plurality of on-board apparatus (34) located on said plurality of vehicles whose travel data are affected by the vehicle whose parameter values or input values are determined to be outside the predetermined range.

28. A system according to claim 10, wherein said transceiver apparatus (36) of said on-board control and data exchange apparatus (34) is operative to provide intermittent probing signals as said vehicle travels along a travel route, and wherein said road-based units include apparatus means for detecting said probing signals and for triggering said road-based units in response there to.

* * * * *